US012155585B2

(12) United States Patent
Patchava et al.

(10) Patent No.: US 12,155,585 B2
(45) Date of Patent: Nov. 26, 2024

(54) PHYSICAL BROADCAST CHANNEL PRECODING IN HIGH-DOPPLER SCENARIOS

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/553,254

(22) Filed: Dec. 16, 2021

(65) Prior Publication Data

US 2023/0198692 A1 Jun. 22, 2023

(51) Int. Cl.
| | |
|---|---|
| *H04L 5/00* | (2006.01) |
| *H04L 25/02* | (2006.01) |
| *H04L 27/26* | (2006.01) |
| *H04W 72/044* | (2023.01) |

(52) U.S. Cl.
CPC .......... *H04L 5/0023* (2013.01); *H04L 5/0048* (2013.01); *H04L 25/0212* (2013.01); *H04L 27/2605* (2013.01); *H04W 72/044* (2013.01)

(58) Field of Classification Search
CPC . H04L 5/0023; H04L 5/0048; H04L 25/0212; H04L 27/2605; H04L 25/03821; H04L 27/2639; H04L 27/2613; H04L 27/26532; H04W 72/044
See application file for complete search history.

(56) References Cited

U.S. PATENT DOCUMENTS

| | | | |
|---|---|---|---|
| 11,121,837 B2* | 9/2021 | Kakishima | H04L 5/0023 |
| 2017/0033899 A1* | 2/2017 | Rakib | H04L 27/2655 |
| 2018/0227866 A1* | 8/2018 | Jung | H04L 5/0053 |
| 2023/0198692 A1* | 6/2023 | Patchava | H04W 72/044 |
| | | | 370/330 |
| 2023/0388910 A1* | 11/2023 | Yuan | H04L 5/0005 |

* cited by examiner

*Primary Examiner* — Afshawn M Towfighi
(74) *Attorney, Agent, or Firm* — Holland & Hart LLP

(57) ABSTRACT

Methods, systems, and devices for wireless communications are described. For example, a wireless device may support physical broadcast channel (PBCH) precoding in high-doppler scenarios. In some cases, a base station may generate a synchronization signal block (SSB) including synchronization signals and PBCH signaling. The base station may transmit, to a UE, the PBCH signaling in accordance with an orthogonal time frequency space (OTFS) precoding and the synchronization signals in accordance with a non-OTFS precoding. The UE may monitor for the SSB and receive the PBCH signaling in accordance with the OTFS precoding and the synchronization signals in accordance with a non-OTFS precoding. The UE may establish or modify a connection with the base station according to the PBCH signaling.

30 Claims, 16 Drawing Sheets

PSS 320

SSS 325

Guard Subcarrier 330

PHYSICAL BROADCAST CHANNEL PRECODING IN HIGH-DOPPLER SCENARIOS

FIELD OF TECHNOLOGY

The following relates to wireless communications, including physical broadcast channel precoding in high-doppler scenarios.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a wireless device may transmit a synchronization signal block (SSB) including a primary synchronization signal (PSS), secondary synchronization signal (SSS), and physical broadcast channel (PBCH) via an orthogonal frequency division multiplexing (OFDM) waveform on a wireless channel. The wireless device may use the PBCH to facilitate decoding of system information on physical downlink control channel (PDSCH). However, in some cases, such as high residual frequency offset or high Doppler spread, decoding an OFDM waveform for PBCH signaling may result in intercarrier interference (ICI) which may inhibit the wireless device from accurately estimating the channel.

SUMMARY

The described techniques relate to improved methods, systems, devices, and apparatuses that support physical broadcast channel (PBCH) precoding in high-doppler scenarios. Generally, the described techniques provide for a wireless device, such as a base station, to generate and transmit a synchronization signal block (SSB) using both orthogonal time frequency space (OTFS) precoding and non-OTFS precoding. For example, the base station may transmit the SSB having synchronization signals, including a primary synchronization signal (PSS) and a secondary synchronization signal (SSS), in accordance with a non-OTFS precoding and a PBCH in accordance with an OTFS precoding. In some cases, PBCH resources in the SSB may be uniformly spaced in time and frequency to support the OTFS precoding. In some examples, the PBCH resources may occupy a second symbol period and a fourth symbol period of the SSB, a second symbol period and a third symbol period of the SSB, or a third symbol period and a fourth symbol period of the SSB. In some examples, the base station may apply one or more guard subcarriers at a high frequency edge, low frequency edge, or both edges of the PBCH to limit interference from neighboring channels. In some cases, the bases station may apply a window on frequency domain resources of the PBCH. By using OTFS precoding for PBCH, a receiving wireless device, such as a UE, may more accurately measure or compute inter-carrier interference (ICI) that occurs in data channels, which may enable more successful data detection.

A method for wireless communications at a UE is described. The method may include monitoring for an SSB having synchronization signals and a broadcast channel, the broadcast channel occupying a set of multiple physical broadcast channel resources that are uniformly spaced in time and frequency, receiving physical broadcast channel signaling over the broadcast channel in accordance with an OTFS precoding, and establishing or modifying a connection with a base station according to the physical broadcast channel signaling.

An apparatus for wireless communications at a UE is described. The apparatus may include a processor, memory coupled with the processor, and instructions stored in the memory. The instructions may be executable by the processor to cause the apparatus to monitor for an SSB having synchronization signals and a broadcast channel, the broadcast channel occupying a set of multiple physical broadcast channel resources that are uniformly spaced in time and frequency, receive physical broadcast channel signaling over the broadcast channel in accordance with an OTFS precoding, and establish or modify a connection with a base station according to the physical broadcast channel signaling.

Another apparatus for wireless communications at a UE is described. The apparatus may include means for monitoring for an SSB having synchronization signals and a broadcast channel, the broadcast channel occupying a set of multiple physical broadcast channel resources that are uniformly spaced in time and frequency, means for receiving physical broadcast channel signaling over the broadcast channel in accordance with an OTFS precoding, and means for establishing or modifying a connection with a base station according to the physical broadcast channel signaling.

A non-transitory computer-readable medium storing code for wireless communications at a UE is described. The code may include instructions executable by a processor to monitor for an SSB having synchronization signals and a broadcast channel, the broadcast channel occupying a set of multiple physical broadcast channel resources that are uniformly spaced in time and frequency, receive physical broadcast channel signaling over the broadcast channel in accordance with an OTFS precoding, and establish or modify a connection with a base station according to the physical broadcast channel signaling.

Some examples of the method, apparatuses, and non-transitory computer-readable medium described herein may further include operations, features, means, or instructions for receiving the synchronization signals in accordance with a non-OTFS precoding, where establishing or modifying the connection with the base station may be based on the synchronization signals.

Some examples of the method, apparatuses, and non-transitory computer-readable medium described herein may further include operations, features, means, or instructions for performing a blind decoding on the physical broadcast channel signaling based on a non-OTFS precoding, where the physical broadcast channel signaling may be received over the broadcast channel in accordance with the OTFS precoding based on the blind decoding being unsuccessful.

In some examples of the method, apparatuses, and non-transitory computer-readable medium described herein, the set of multiple physical broadcast channel resources occupy a second symbol period and a fourth symbol period of the SSB, and the synchronization signals occupy a first symbol period and a third symbol period of the SSB.

In some examples of the method, apparatuses, and non-transitory computer-readable medium described herein, the set of multiple physical broadcast channel resources occupy a second symbol period and a third symbol period of the SSB, and the synchronization signals occupy a first symbol period and a fourth symbol period of the SSB.

In some examples of the method, apparatuses, and non-transitory computer-readable medium described herein, the set of multiple physical broadcast channel resources occupy a third symbol period and a fourth symbol period of the SSB, and the synchronization signals occupy a first symbol period and a second symbol period of the SSB.

In some examples of the method, apparatuses, and non-transitory computer-readable medium described herein, the physical broadcast channel signaling may be received in accordance with the OTFS precoding based on a quantity of the set of multiple physical broadcast channel resources.

In some examples of the method, apparatuses, and non-transitory computer-readable medium described herein, receiving the physical broadcast channel signaling may include operations, features, means, or instructions for receiving the physical broadcast channel signaling over the broadcast channel based on one or more guard subcarriers at a high frequency edge or a low frequency edge, or both, of the set of multiple physical broadcast channel resources.

In some examples of the method, apparatuses, and non-transitory computer-readable medium described herein, the one or more guard subcarriers include zeroed bits.

In some examples of the method, apparatuses, and non-transitory computer-readable medium described herein, the one or more guard subcarriers include cyclic prefix information.

In some examples of the method, apparatuses, and non-transitory computer-readable medium described herein, receiving the physical broadcast channel signaling may include operations, features, means, or instructions for receiving the physical broadcast channel signaling based on a window applied on frequency domain resources of the broadcast channel based on the OTFS precoding.

Some examples of the method, apparatuses, and non-transitory computer-readable medium described herein may further include operations, features, means, or instructions for receiving a set of multiple demodulation reference signals over the broadcast channel in accordance with the OTFS precoding.

In some examples of the method, apparatuses, and non-transitory computer-readable medium described herein, a delay domain length of the set of multiple demodulation reference signals may be based on a delay spread to physical broadcast channel bandwidth ratio, and a Doppler domain length of the set of multiple demodulation reference signals may be based on a quantity of physical broadcast channel symbols.

In some examples of the method, apparatuses, and non-transitory computer-readable medium described herein, resources for the set of multiple demodulation reference signals in the set of multiple physical broadcast channel resources may be based on a cell identifier of the base station.

In some examples of the method, apparatuses, and non-transitory computer-readable medium described herein, the set of multiple physical broadcast channel resources include a set of multiple portions of the set of multiple demodulation reference signals.

In some examples of the method, apparatuses, and non-transitory computer-readable medium described herein, the set of multiple demodulation reference signals include a Zadoff-Chu sequence or a pseudo-random noise sequence.

Some examples of the method, apparatuses, and non-transitory computer-readable medium described herein may further include operations, features, means, or instructions for receiving, from the base station, an indication of the OTFS precoding for the physical broadcast channel signaling through the synchronization signals.

A method for wireless communications at a base station is described. The method may include generating an SSB having synchronization signals and a broadcast channel, the broadcast channel occupying a set of multiple physical broadcast channel resources that are uniformly spaced in time and frequency, transmitting physical broadcast channel signaling over the broadcast channel in accordance with an OTFS precoding, and establishing or modifying a connection with a UE according to the physical broadcast channel signaling.

An apparatus for wireless communications at a base station is described. The apparatus may include a processor, memory coupled with the processor, and instructions stored in the memory. The instructions may be executable by the processor to cause the apparatus to generate an SSB having synchronization signals and a broadcast channel, the broadcast channel occupying a set of multiple physical broadcast channel resources that are uniformly spaced in time and frequency, transmit physical broadcast channel signaling over the broadcast channel in accordance with an OTFS precoding, and establish or modify a connection with a UE according to the physical broadcast channel signaling.

Another apparatus for wireless communications at a base station is described. The apparatus may include means for generating an SSB having synchronization signals and a broadcast channel, the broadcast channel occupying a set of multiple physical broadcast channel resources that are uniformly spaced in time and frequency, means for transmitting physical broadcast channel signaling over the broadcast channel in accordance with an OTFS precoding, and means for establishing or modifying a connection with a UE according to the physical broadcast channel signaling.

A non-transitory computer-readable medium storing code for wireless communications at a base station is described. The code may include instructions executable by a processor to generate an SSB having synchronization signals and a broadcast channel, the broadcast channel occupying a set of multiple physical broadcast channel resources that are uniformly spaced in time and frequency, transmit physical broadcast channel signaling over the broadcast channel in accordance with an OTFS precoding, and establish or modify a connection with a UE according to the physical broadcast channel signaling.

Some examples of the method, apparatuses, and non-transitory computer-readable medium described herein may further include operations, features, means, or instructions for transmitting the synchronization signals in accordance with a non-OTFS precoding, where establishing or modifying the connection with the UE may be based on the synchronization signals.

In some examples of the method, apparatuses, and non-transitory computer-readable medium described herein, the set of multiple physical broadcast channel resources occupy a second symbol period and a fourth symbol period of the SSB, and the synchronization signals occupy a first symbol period and a third symbol period of the SSB.

In some examples of the method, apparatuses, and non-transitory computer-readable medium described herein, the set of multiple physical broadcast channel resources occupy a second symbol period and a third symbol period of the SSB, and the synchronization signals occupy a first symbol period and a fourth symbol period of the SSB.

In some examples of the method, apparatuses, and non-transitory computer-readable medium described herein, the set of multiple physical broadcast channel resources occupy a third symbol period and a fourth symbol period of the SSB, and the synchronization signals occupy a first symbol period and a second symbol period of the SSB.

In some examples of the method, apparatuses, and non-transitory computer-readable medium described herein, the physical broadcast channel signaling may be transmitted in accordance with the OTFS precoding based on a quantity of the set of multiple physical broadcast channel resources.

In some examples of the method, apparatuses, and non-transitory computer-readable medium described herein, transmitting the physical broadcast channel signaling may include operations, features, means, or instructions for transmitting the physical broadcast channel signaling over the broadcast channel with on one or more guard subcarriers at a high frequency edge or a low frequency edge, or both, of the set of multiple physical broadcast channel resources that may be uniformly spaced in time and frequency.

In some examples of the method, apparatuses, and non-transitory computer-readable medium described herein, the one or more guard subcarriers include zeroed bits or cyclic prefix information, or both.

Some examples of the method, apparatuses, and non-transitory computer-readable medium described herein may further include operations, features, means, or instructions for applying a window on frequency domain resources of the broadcast channel based on the OTFS precoding.

Some examples of the method, apparatuses, and non-transitory computer-readable medium described herein may further include operations, features, means, or instructions for transmitting a set of multiple demodulation reference signals over the broadcast channel in accordance with the OTFS precoding.

In some examples of the method, apparatuses, and non-transitory computer-readable medium described herein, a delay domain length of the set of multiple demodulation reference signals may be based on a delay spread to physical broadcast channel bandwidth ratio, and a Doppler domain length of the set of multiple demodulation reference signals may be based on a quantity of physical broadcast channel symbols.

In some examples of the method, apparatuses, and non-transitory computer-readable medium described herein, resources for the set of multiple demodulation reference signals in the set of multiple physical broadcast channel resources may be based on a cell identifier of the base station.

In some examples of the method, apparatuses, and non-transitory computer-readable medium described herein, the set of multiple physical broadcast channel resources include a set of multiple portions of the set of multiple demodulation reference signals.

In some examples of the method, apparatuses, and non-transitory computer-readable medium described herein, the set of multiple demodulation reference signals include a Zadoff-Chu sequence or a pseudo-random noise sequence.

Some examples of the method, apparatuses, and non-transitory computer-readable medium described herein may further include operations, features, means, or instructions for transmitting, to the UE, an indication of the OTFS precoding for the physical broadcast channel signaling through the synchronization signals.

DETAILED DESCRIPTION

Figure 1:
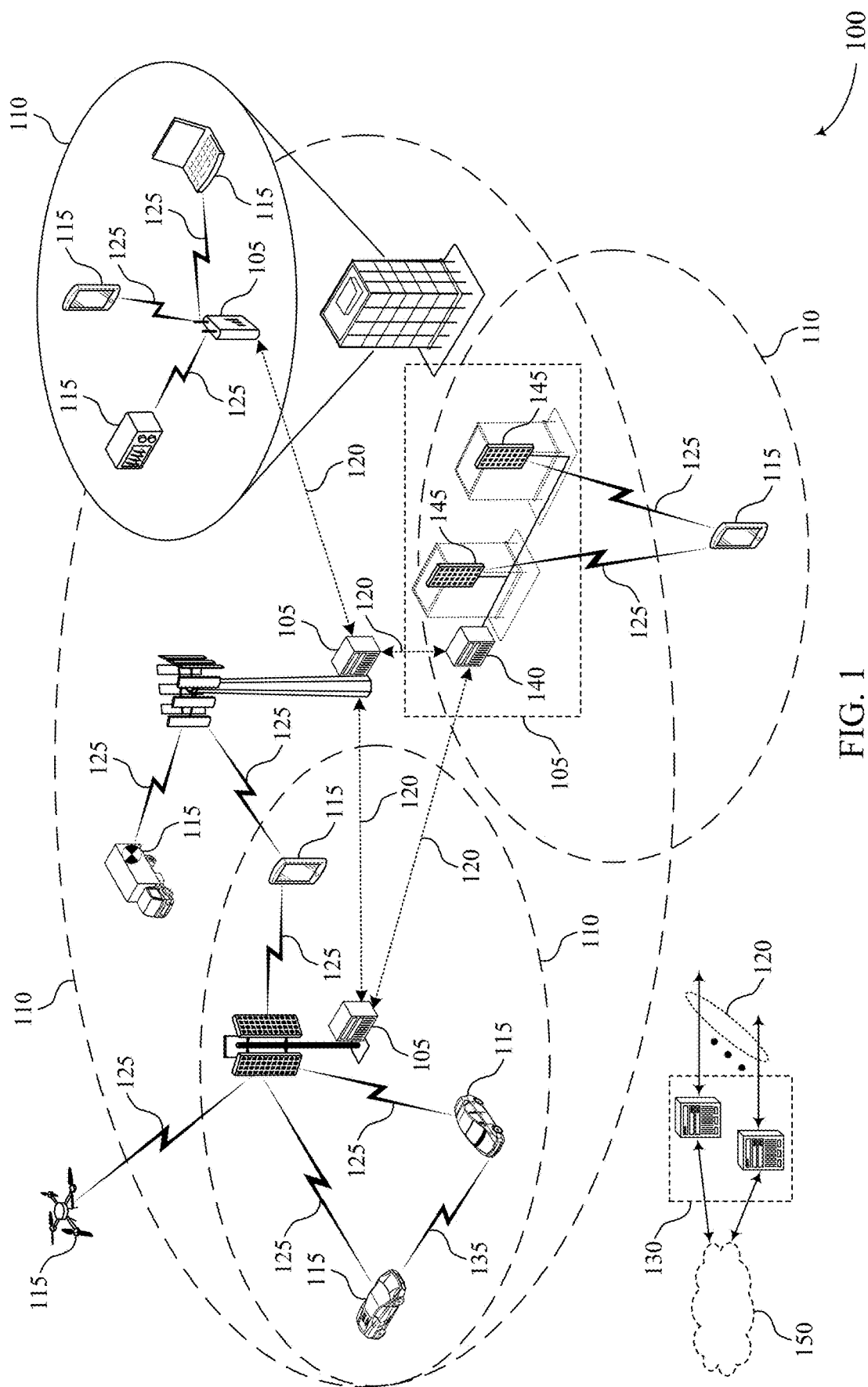
FIG. 1 illustrates an example of a wireless communications system that supports physical broadcast channel (PBCH) precoding in high-doppler scenarios in accordance with aspects of the present disclosure.

In some wireless communication systems, a first device, such as a user equipment (UE), may receive a synchronization signal block (SSB), including synchronization signals, including a primary synchronization signal (PSS) and a secondary synchronization signal (SSS), and physical broadcast channel (PBCH), via an orthogonal frequency division multiplexing (OFDM) waveform on a wireless channel. The UE may use the PBCH to facilitate decoding of system information on physical downlink control channel (PDSCH). Use of an OFDM waveform for PBCH may result in high residual frequency offset during decoding which may introduce intercarrier interference (ICI). Additionally or alternatively, use of an OFDM waveform for PBCH may be associated with a specific and inflexible resource allocation for PBCH demodulation reference signals (DMRS). In some scenarios, including when the UE experiences high Doppler spread during PBCH decoding, the specific and inflexible resource allocation for PBCH DMRS in OFDM may inhibit the UE from accurately estimating the channel.

Techniques described herein may support types of precoding for different portions of an SSB, such as first precoding type for a PBCH portion of the SSB and a second precoding type for the PSS and SSS portion of the SSB. For example, a second device, such as a network entity or a base station, may perform an orthogonal time frequency space (OTFS) precoding for the PBCH portion of the SSB, but not for the PSS or SSS portion. To support an OTFS precoding for the PBCH portion, the network entity may allocate a set of PBCH symbols to a delay-Doppler domain and may perform an inverse symplectic fast Fourier transform (IS-FFT) on the PBCH symbols to transform the PBCH symbols to a time-frequency domain. Additionally or alternatively, the PBCH may be placed in a given symbol position within the SSB and precoded by ISFFT, as in the OTFS waveform, such that the PBCH maintains the same total number of resources as in the OFDM waveform. In some examples, resources for the PBCH portion of the SSB may be uniform (e.g., in time and frequency), or may have common resource allocation sizes, to support the OTFS precoding. In some cases, each PBCH in an SSB may contain guard subcarriers at the high frequency edge, low frequency edge, or both edges to limit interference from other channels. In some cases, the network entity may applying a window on frequency domain resources of the PBCH after ISFFT processing to constrain the delay spread due to low resolution in the frequency domain.

By using OTFS-precoding for PBCH, the UE may more accurately measure or compute inter-carrier interference (ICI) that occurs in data channels, which may enable more successful data detection. As a result of a more accurate estimation of the channel and more successful data detection, the UE may have a greater reliability in successfully receiving and decoding the information symbols carried by the signal, which may support greater spectral efficiency, higher data rates, and increased system capacity, among other benefits, across various and diverse deployment scenarios (including scenarios associated with high Doppler spreads).

Aspects of the disclosure are initially described in the context of wireless communications systems. Aspects of the disclosure are then described in the context of an OTFS precoded PBCH allocation, PBCH, coding scheme, and processing diagram. Aspects of the disclosure are further illustrated by and described with reference to apparatus diagrams, system diagrams, and flowcharts that relate to PBCH precoding in high-doppler scenarios.

FIG. 1 illustrates an example of a wireless communications system 100 that supports PBCH precoding in high-doppler scenarios in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the Medium Access Control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, a first device, such as a UE 115, may receive an SSB via an OFDM waveform. For example, the UE 115 may use PBCH within the SSB to facilitate decoding system information on PDSCH. Use of an OFDM waveform for PBCH within an SSB may be associated with a specific and inflexible allocation of the PBCH to time and frequency resources and, in some scenarios (such as scenarios associated with high Doppler spread), such a specific and inflexible allocation may result in ICI in the PBCH and inhibit an ability of the UE 115 to accurately estimate the PBCH DMRS channel due to the highly time-varying channel.

To support accurate channel estimation in high Doppler spread scenarios, communicating devices may support different precodings for different portions of a SSB, such as a first precoding type for a PBCH portion of the SSB and a second precoding type for PSS and SSS portions of the SSB. For example, a second device, such as a network entity or a base station 105, may perform an OTFS precoding for the PBCH portion of the SSB, but may refrain from performing an OTFS precoding for the PSS and SSS portions of the SSB. To support an OTFS precoding for the PBCH portion, the base station 105 may allocate a set of PBCH symbols to a delay-Doppler domain and may perform an ISFFT on the PBCH symbols to transform the PBCH symbols to a time-frequency domain.

The base station 105 may allocate a set of PSS and SSS symbols to remaining resources within a resource allocation in the time-frequency domain, and the base station 105 may transmit the SSB to the UE 115. The UE 115 may receive the SSB and, in some implementations, may perform a sympletic fast Fourier transform (SFFT) on the time-frequency resources to which the PBCH symbols are allocated to transform the PBCH symbols back to the delay-Doppler domain.

As described herein, precoding may refer to one or more signal processing tasks associated with adjusting a signal to improve a resiliency or robustness of the signal to interference, such as ICI, inter-symbol interference, or inter-channel interference. In some aspects, precoding may involve one or more allocations or transformations of one or more symbols, or of sequences associated with one or more symbols, between different domains. Additional details relating to the OTFS precoding described herein are illustrated by and described with reference to FIGS. 5 and 6.

Figure 2:
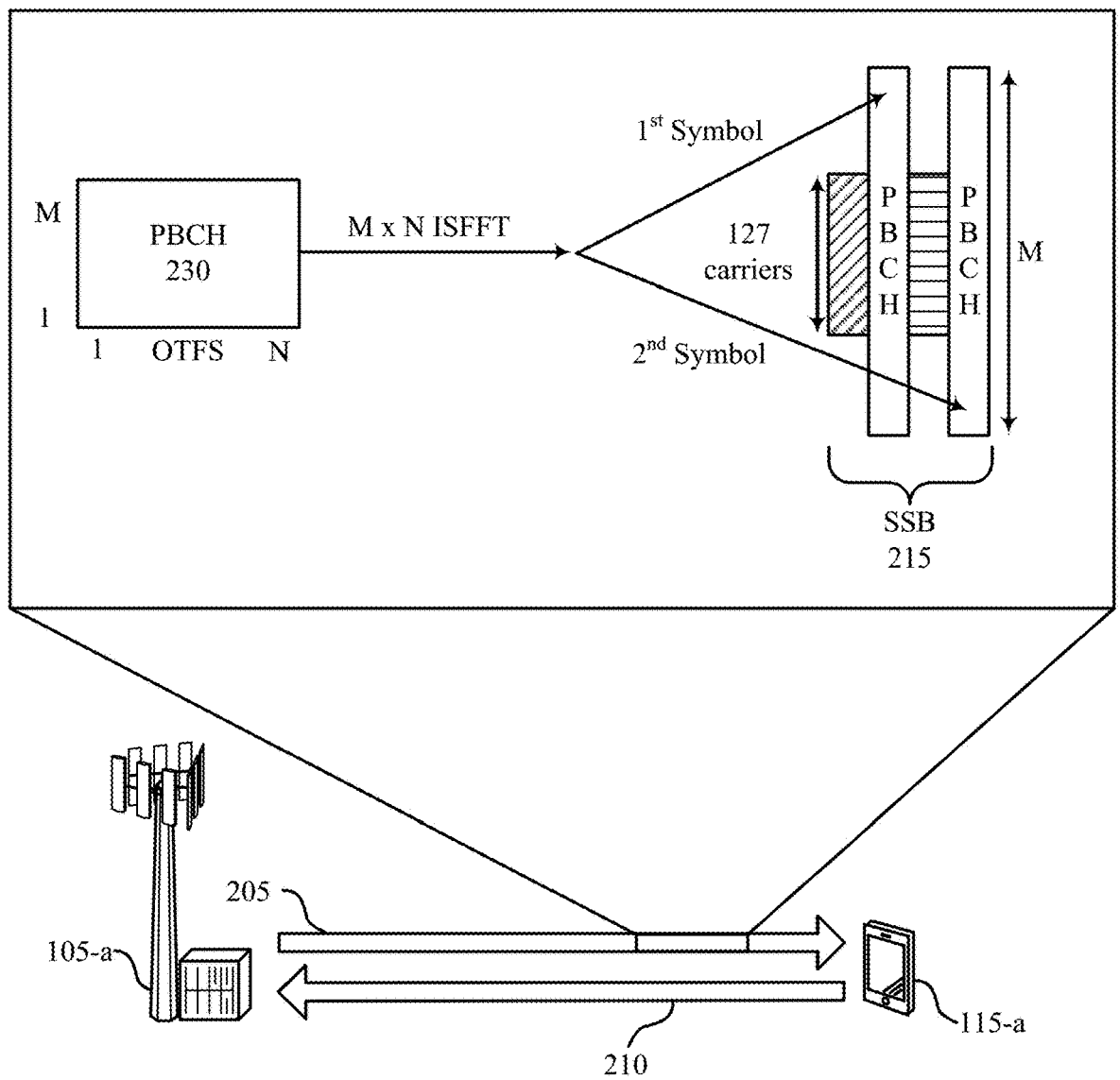
FIG. 2 illustrates an example of a wireless communications system that supports PBCH precoding in high-doppler scenarios in accordance with aspects of the present disclosure.
Figure 2:
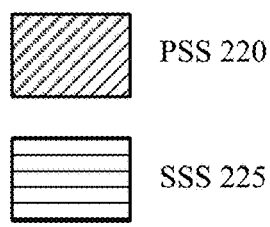

FIG. 2 illustrates an example of a wireless communications system 200 that supports PBCH precoding in high-doppler scenarios in accordance with aspects of the present disclosure.

In some examples, wireless communications system 200 may implement aspects of wireless communications system 100 and may include a UE 115-a and a base station 105-a, which may be examples of a UE 115 and a base station 105 and may communicate with one another as described above with reference to FIG. 1. For example, the base station 105-a may transmit downlink communications 205 to the UE 115-a and the UE 115-a may transmit uplink communications 210 to the base station 105-a, though it is to be understood other communications (e.g., sidelink communications) and devices. (e.g., multiple UEs 115, IoT devices, roadside units (RSUs), base stations 105, or any combination thereof, among other examples of wireless devices) may be used. For example, the base station 105-a may transmit an SSB 215 to the UE 115-a via downlink communications 205.

In some systems, a UE 115 may monitor for and receive an SSB including a PSS, an SSS, and a PBCH via an OFDM waveform on a wireless channel. For example, the SSB may include 4 symbols in the OFDM waveform. The PBCH may occupy 240 subcarriers in each of the second and fourth symbols and 96 subcarriers in the third symbol. Further, the PBCH may accommodate a PBCH payload and a PBCH DMRS. The PBCH DMRS may facilitate decoding of system information on PDSCH. Additionally or alternatively, the PBCH DMRS may occupy a percentage of the PBCH resources (e.g., 25%) and may be placed uniformly across the PBCH resources for improved channel estimation. However, PBCH decoding in OFDM may be susceptible to high residual frequency offset, large Doppler spread, or both. For example, frequency offset at the UE 115 may be high even after coarse frequency correction via the PSS and the SSS processing. The high frequency offset may result in ICI in the PBCH which may degrade performance of the OFDM SSB transmission. Additionally or alternatively, the UE 115 may experience high Doppler spread (e.g., high speed train (HST) users) resulting in ICI in the PBCH. In such cases, the UE 115 may be unable to accurately estimate the PBCH DMRS channel due to the high time-varying channel.

In some implementations, and to support an accurate channel measurement or estimation (including an interference, such as an ICI, measurement or estimation), the UE 115-a and the base station 105-a may support using an OTFS precoding for the PBCH 230 and a non-OTFS precoding for the PSS 220 and the SSS 225 in the SSB 215. For example, the UE 115-a and the base station 105-a may support use of an OTFS waveform for the PBCH 230 of the SSB 215 and may support use of an OFDM waveform for the PSS 220 and the SSS 225 of the SSB 215. As such, the base station 105-a may transmit the SSB 215 including an OTFS precoded first waveform portion carrying the PBCH 230 and a non-OTFS precoded second waveform portion (such as a waveform portion that is exclusively associated with OFDM) carrying the PSS 220 and the SSS 225.

In some cases, the UE 115-a may monitor for the SSB 215 and, in some cases, may perform a blind decoding on the SSB based on a non-OTFS precoding. If the UE 115-a cannot decode the PBCH portion based on the non-OTFS precoding or the blind decoding is unsuccessful, the UE 115-a may receive, or decode, the PBCH in accordance with the OTFS precoding. Additionally, or alternatively, the SSB 215 may include an indication of the OTFS precoding for the PBCH 230. In some aspects, the OTFS precoded first waveform portion may be multiplexed with the non-OTFS precoded second waveform portion.

In some case, the base station 105-a may place the PBCH 230 in the second and fourth symbols of the SSB 215 and samples in the time-frequency domain may be precoded by ISFFT (e.g., as in the OTFS waveform), as described with reference to FIGS. 5 and 6. That is, the base station 105-a may allocate or place the PBCH 230 in a delay-Doppler domain associated with a delay-domain size of M and a Doppler-domain size of N. Accordingly, the base station 105-a may precode the PBCH 230 by an ISFFT of dimensions M×N. For example, the base station 105-a may place the PBCH 230 in a delay-Doppler domain associated with a delay-domain size, M, of 2 and a Doppler-domain size, N, of 288, such that the PBCH 230 is precoded by an ISFFT of size 288×2 to maintain the same total number of resources as a PBCH of an OFDM waveform. As such, resource allocation of the PBCH 230 may support the OTFS waveform as the samples may be placed uniformly in the time-frequency domain.

In some cases, the base station 105-a may place the PSS 220 in the first symbol of the SSB 215 and the SSS 225 in the third symbol of the SSB 215. In some cases, the PSS 220 and the SSS 225 may each be 127 subcarriers and the PBCH 230 may be M subcarriers. For example, M may be based on a number of symbol periods the PBCH 230 occupies, such as occupying 288 subcarriers when the PBCH 230 is allocated to uniform resources in two symbol periods.

In some cases, such as high Doppler spread channels or high frequency offset scenarios, transmitting the PBCH 230 in delay-Doppler domain as supported by the OTFS waveform rather than time-frequency domain as supported by the OFDM waveform may result in constant fading and multi-path diversity. Additionally, or alternatively, OTFS-precoding for the PBCH 230 may result in diversity through channel equalization rather than coding (e.g., rather than coding in OFDM where high code lengths are not possible due to low payload size PBCH).

Figure 3:
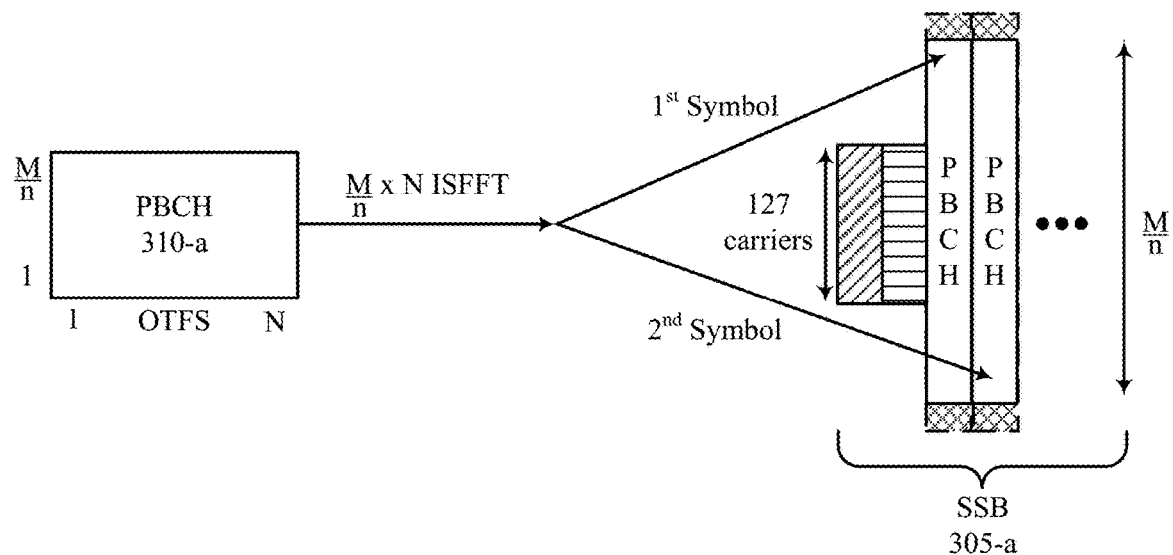
FIG. 3 illustrates an example of an orthogonal time frequency space (OTFS) precoded PBCH allocation that supports PBCH precoding in high-doppler scenarios in accordance with aspects of the present disclosure.
Figure 3:
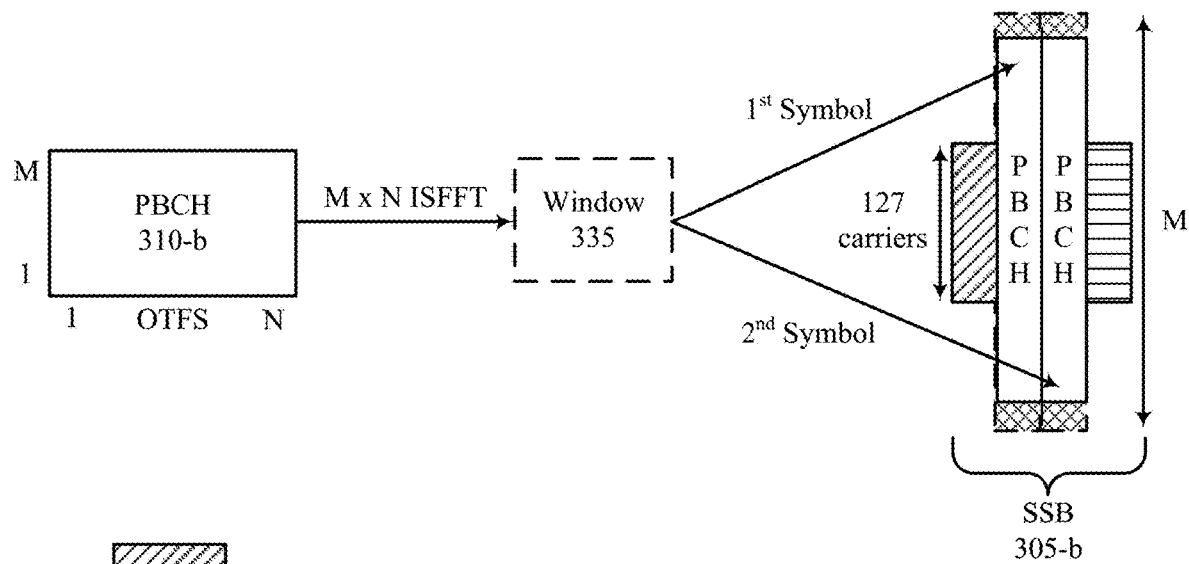
Figure 3:
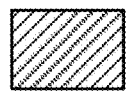
Figure 3:
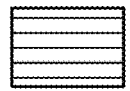
Figure 3:
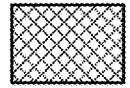

FIG. 3 illustrates an example of an OTFS precoded PBCH allocation 300 that supports PBCH precoding in high-doppler scenarios in accordance with aspects of the present disclosure. In some examples, the OTFS precoded PBCH allocation 300 may implement aspects of wireless communications system 100 and wireless communications system 200 and may be transmitted between two or more wireless devices as described above with reference to FIG. 1 and FIG. 2. For example, a base station 105-a may transmit an SSB 305 to the UE 115-a via downlink communications 205

In some case, the base station 105-a may place PBCH, such as PBCH 310-a, in the third and fourth symbols of an SSB, such as the SSB 305-a, and samples in the time-frequency domain may be precoded by ISFFT (e.g., as in the OTFS waveform), as described with reference to FIGS. 5 and 6. That is, the base station 105-a may allocate or place the PBCH 310-a in a delay-Doppler domain associated with a delay-domain size of M and a Doppler-domain size of N. Accordingly, the base station 105-a may precode the PBCH 310-a by an ISFFT of dimensions M×N. For example, in some cases, the base station 105-a may place the PBCH 310-a in a delay-Doppler domain associated with a delay-domain size, M, of 2 and a Doppler-domain size, N, of 288, such that the PBCH 310-a is precoded by an ISFFT of size 288×2 to maintain the same total number of resources as a PBCH 310 in the OFDM waveform. The resource allocation of the PBCH 310-a may support the OTFS waveform, as the samples may be placed uniformly in the time-frequency domain. Further, the PSS 320 may be placed in the first symbol of the SSB 305-a and the SSS 325 may be placed in the third symbol of the SSB 305-a. In some cases, the PSS 220 and the SSS 225 may each be 127 subcarriers and the PBCH 230 may be M subcarriers.

In some cases, the PBCH 310-a may be spread over more than 2 symbols in time, such that the PBCH 310-a is spread over n symbols. In such cases, the base station 105-a may place the PBCH 310-a in the third, fourth, and subsequent symbols of the SSB 305-a, and samples in the time-frequency domain may be precoded by ISFFT. That is, the base station 105-a may allocate or place the PBCH 310-a in a delay-Doppler domain associated with a delay-domain size of M/n and a Doppler-domain size of N. Accordingly, the base station 105-a may precode the PBCH 310-a by an ISFFT of dimensions M/n×N. For example, the base station 105-a may place the PBCH 310-a in a delay-Doppler domain associated with a delay-domain size, M, of 2, a Doppler-domain size, N, of 288, and a symbol quantity, n, equal to 4, such that the PBCH 310-a is precoded by an ISFFT of size 72×2 to maintain the same total number of resources as a PBCH 310 in the OFDM waveform. The base station 105-a may place the PBCH 310-a in the third, fourth, fifth, and sixth symbols of the SSB 305-a based on the symbol quantity of 4. As such, resource allocation of the PBCH 310-a may support the OTFS waveform as the samples may be placed uniformly in the time-frequency domain. Further, the PSS 320 may be placed in the first symbol of the SSB 305-a and the SSS 325 may be placed in the third symbol of the SSB 305-a. In some cases, the PSS 220 and the SSS 225 may each be 127 subcarriers and the PBCH 230 may ben subcarriers.

Spreading the PBCH 310-a over more than two symbols may result in higher Doppler resolution in the OTFS waveform, which may allow the UE 115-a to decode the PBCH 310-a with higher diversity.

In some case, the base station 105-a may place PBCH, such as PBCH 310-b, in the second and third symbols of an SSB, such as an SSB 305-b, and samples in the time-frequency domain may be precoded by ISFFT (e.g., as in the OTFS waveform), as described with reference to FIGS. 5 and 6. That is, the base station 105-a may allocate or place the PBCH 310-b in a delay-Doppler domain associated with a delay-domain size of M and a Doppler-domain size of N. Accordingly, the base station 105-a may precode the PBCH 310-b by an ISFFT of dimensions M×N. For example, the base station 105-a may place the PBCH 310-b in a delay-Doppler domain associated with a delay-domain size, M, of 2 and a Doppler-domain size, N, of 288, such that the PBCH 310-b is precoded by an ISFFT of size 288×2 to maintain the same total number of resources as a PBCH 310 in the OFDM waveform. As such, resource allocation of the PBCH 310-a may support the OTFS waveform as the samples may be placed uniformly in the time-frequency domain. Further, the PSS 320 may be placed in the first symbol of the SSB 305-a and the SSS 325 may be placed in the fourth symbol of the SSB 305-a. In some cases, the PSS 220 and the SSS 225 may each be 127 subcarriers and the PBCH 230 may be M subcarriers.

In some cases, each time domain symbol in a PBCH 310, such as a first symbol and a second symbol, may contain guard subcarriers 330 at the high frequency edge, low frequency edge, or both edges of the symbol. That is, the base station 105-a may place guard subcarriers 330 at the high frequency edge, low frequency edge, or both edges of the time domain symbol exposed to additional channels to limit interference from the additional channels. In some case, the guard subcarriers 330 may be zeroes, or include zeroed bits. Additionally or alternatively, the guard subcarriers 330 may include cyclic prefix information, such as a cyclic prefix portion of the other edge of the PBCH symbol. For example, time domain symbols of PBCH 310 may contain repeating prefixed symbols, or cyclic prefixes, at the high and low frequency edges and the guard subcarriers 330 may be equal to those cyclic prefixes. For example, a time domain symbol for the PBCH 310 may have a first edge with a first cyclic prefix portion and a second edge with a second cyclic prefix portion. A guard subcarrier 330 at the first edge may be equal to the second cyclic prefix portion and a guard subcarrier 330 at the second edge may be equal to the first cyclic prefix portion.

In some cases, the base station 105-a may place a window constraint, such as a window 335, in the delay-frequency domain after ISFFT processing. For example, the base station 105-a may allocate or place the PBCH 310-b in a delay-Doppler domain associated with a delay-domain size, M, and a Doppler-domain size, N, such that the PBCH 310-b is precoded by an ISFFT of size M×N to maintain the same total number of resources as a PBCH 310 in the OFDM waveform. The base station 105-a may apply the window 335 of length M on each column of the PBCH 310-b based on the ISFFT processing. The window 335 may be used to constrain the delay spread due to low resolution in the frequency domain. For example, a hamming or prolate spheroidal window can be applied on each column after ISFFT processing.

Though described in various embodiments, it is understood that any combinations of techniques described herein may be used to support OTFS-precoding for PBCH in accordance with aspects of the present disclosure. For example, additional schemes or techniques for allocating or assigning PBCH resources within an SSB to support an OTFS precoding are supported.

Figure 4:
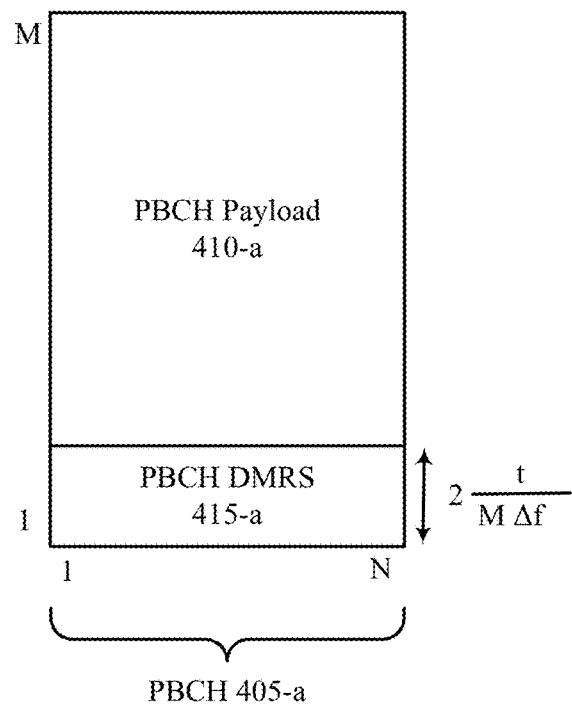
FIG. 4 illustrates an example of a PBCH configuration that supports PBCH precoding in high-doppler scenarios in accordance with aspects of the present disclosure.
Figure 4:
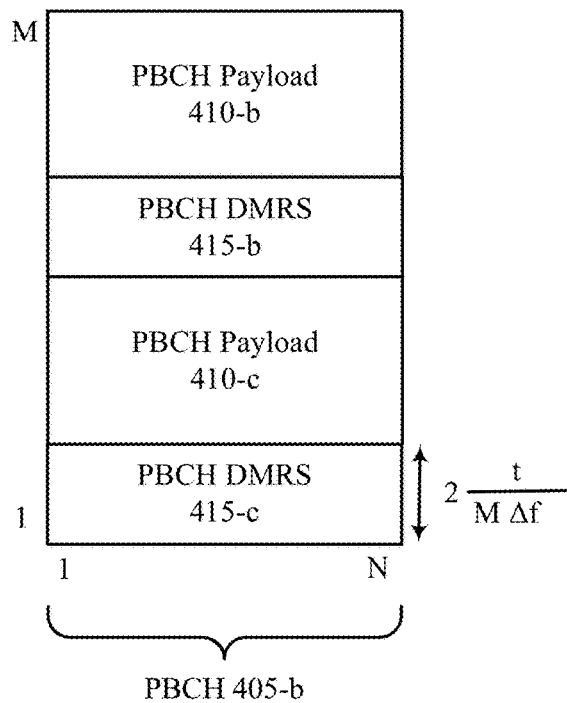

FIG. 4 illustrates an example of a PBCH configuration 400 that supports PBCH precoding in high-doppler scenarios in accordance with aspects of the present disclosure. In some examples, PBCH configuration 400 may implement aspects of wireless communications system 100, wireless communications system 200, and the OTFS precoded PBCH allocation 300 and may be communicated as described above with reference to FIG. 1-3. For example, a PBCH 405 may be an example of a PBCH 230 or a PBCH 310.

As described with reference to FIG. 2, a UE 115 and a base station 105 may support OTFS precoded PBCH, such as a PBCH 405-a or a PBCH 405-b, or both. That is, the PBCHs 405, including one or more PBCH payloads 410 and one or more PBCH DMRSs 415, may be placed in the delay-Doppler domain. For example, the PBCH 405-a may include a PBCH payload 410-a and a PBCH DMRS 415-a. Further, a base station 105 may place the one or more PBCH DMRSs 415 in the delay-Doppler domain with continuous delay-Doppler resources (e.g., rather than uniform spacing in OFDM waveform). In some cases, the one or more PBCH DMRSs 415 length in delay may be selected as 2 times the ratio of the delay spread, $t_{max}$, to the PBCH 405 bandwidth, $\Delta f$, and the one or more PBCH DMRSs 415 length in Doppler may be equal to the number of the PBCH 405 symbols, M. For example, the PBCH DMRS 415 length in delay may be equal to Equation 1.

$$\text{Length in Delay} = 2 \frac{t_{max}}{M \Delta f} \quad (1)$$

In some cases, such as with high Doppler spread or high frequency offset, the base station 105 may place multiple PBCH DMRSs 415, or multiple PBCH DMRS chunks, uniformly across the delay-Doppler plane. For example, a PBCH 405-b may include a PBCH payload 410-b, a PBCH payload 410-c, a PBCH DMRS 415-b, and a PBCH DMRS 415-c.

In some cases, a sequence with good correlation properties (e.g., Zadoff-Chu or pseudo-random noise sequence) may be used for the one or more PBCH DMRSs 415 for accurate channel estimation at a receiver. That is, the one or more PBCH DMRSs 415 may use sequence properties resulting in high similarity with correlated signals. Additionally or alternatively, position of the one or more PBCH DMRSs 415 may be decided based on a physical cell ID.

Figure 5:
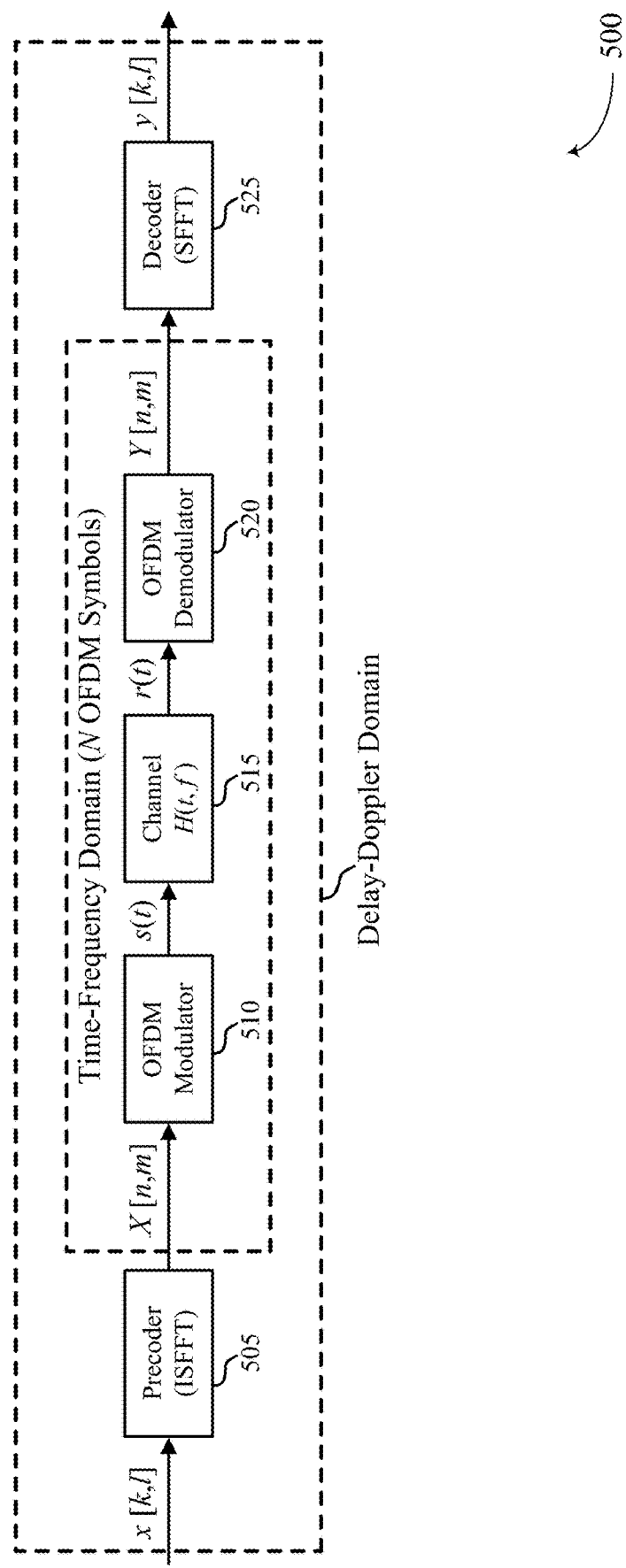
FIG. 5 illustrates an example of a coding scheme that supports PBCH precoding in high-doppler scenarios in accordance with aspects of the present disclosure.

FIG. 5 illustrates an example of a coding scheme 500 that supports PBCH precoding in high-doppler scenarios in accordance with aspects of the present disclosure. The coding scheme 500 may be implemented to realize aspects of the wireless communications system 100, the wireless communications system 200, the OTFS precoded PBCH allocation 300, or the PBCH configuration 400. For example, as described with reference to FIG. 2, a base station 105-a and a UE 115-a may perform one or more operations or processing tasks associated with the coding scheme 500 to transmit or receive SSB 215 including or otherwise conveying an OTFS precoded first waveform portion carrying PBCH 230 and a non-OTFS precoded second waveform portion carrying PSS 220 and SSS 225.

In some aspects, OTFS modulation or precoding may be seen or understood as an ISFFT precoder 505 applied or performed on N consecutive OFDM symbols. For example, base station 105-a may include one or more components associated with the ISFFT precoder 505 and may perform or apply an ISFFT to a set of symbols x[k,l] (which may be examples of PBCH 230). An ISFFT may be an example of a 2D FFT, where N is a quantity of OFDM symbols and M is a quantity of subcarriers. As part of the coding scheme 500, symbols (such as for PBCH) may be placed in the delay-Doppler domain instead of in the time-frequency domain (as may be performed for OFDM) and the base station 105-a may transform the symbols from the delay-Doppler domain to the time-frequency domain via an ISFFT. Further, an ISFFT may be associated with an inverse fast Fourier transform (IFFT) in the Doppler domain and a fast Fourier transform (FFT) in the delay domain, as illustrated by and described in more detail with reference to FIG. 6.

The base station 105-a may obtain, as an output of the ISFFT precoder 505, a set of symbols X[n, m], which may be defined in accordance with Equation 2.

$$X[n, m] = \frac{1}{\sqrt{NM}} \sum_{k=0}^{N-1} \sum_{l=0}^{M-1} x[k, l] e^{j2\pi \left( \frac{nk}{N} - \frac{ml}{M} \right)} \quad (2)$$

The base station 105-a may perform or apply an OFDM modulator 510 on the set of symbols X[n,m] to obtain a time-domain signal s(t) and may transmit the time-domain signal s(t) over-the-air to the UE 115-a. The over-the-air signaling between the base station 105-a and the UE 115-a may be associated with a time-frequency channel 515, which may be understood as H(t, f). The time-frequency channel 515 may be related to the delay-Doppler channel. For example, in some implementations, a relationship between the delay-Doppler channel h(r, v) and the time-frequency channel 515 H(t, f) may be defined in accordance with Equations 3 and 4.

$$h(\tau,v) = \iint H(t,f) e^{-j2\pi(vt-f\tau)} dt \, df \quad (3)$$

$$H(t,f) = \iint h(\tau,v) e^{j2\pi(vt-f\tau)} d\tau \, dv \quad (4)$$

In a discrete domain (such as in a domain associated with a quantity of discrete points or values), the relationship between the delay-Doppler channel h(τ, v)=h(l, k) and the time-frequency channel 515 H(t, f)=H(n, m) may be defined in accordance with Equations 5 and 6.

$$h[l, k] = \sum_{n=0}^{N-1} \sum_{m=0}^{M-1} H[n, m] e^{-j2\pi nk} e^{j2\pi ml} \quad 5)$$

$$h[n, m] = \sum_{k} \sum_{l} H[l, k] e^{j2\pi nk} e^{-j2\pi ml} \quad (6)$$

In some aspects, and due to or associated with an underspread nature of the channel, h[l, k] may be non-zero for $$k < \frac{v_{max}}{\Delta f}, l < \frac{\tau_{max}}{T},$$

where Δf is a subcarrier spacing, T is an OFDM symbol duration, M is a quantity of subcarriers, N is a quantity of OFDM symbols, and $\tau_{max}$ and $v_{max}$ are a maximum delay spread and a maximum Doppler spread of the channel, respectively.

The UE 115-a may receive a time-domain signal r(t) (such that r(t)=H(t, f)s(t)) and may perform or apply an OFDM demodulator 520 on the time domain signal r(t) to obtain a set of symbols Y[n, m] in the time-frequency domain. The UE 115-a may perform or apply, via one or more components associated with an SFFT precoder 525, an SFFT on the set of symbols Y[n, m] in the time-frequency domain to obtain a set of symbols y[k, l] in the delay-Doppler domain. The UE 115-a may perform or apply a circular correlation or convolution to obtain the delay-Doppler channel and an OTFS input-output relation in scenarios of delay-Doppler channel may be associated with a circular convolution (such as a 2D circular convolution) with varying phase shifts and defined in accordance with Equation 7.

$$y[k, l] = \sum_{i=0}^{P} h_i e^{j2\pi\left(\frac{l-l_{\tau_i}}{M}\right)\frac{k v_i}{N}} \alpha_i(k, l) \times \left[[k - k_{v_i}]_N, [l - l_{\tau_i}]_M\right] \quad (7)$$

In some aspects, and due in part to the under-spread nature, the channel may occupy a relatively small fraction or portion (such as a relatively small fraction or portion around an origin) of a delay-Doppler grid. As shown in Equation 6, P may be a quantity of delay-Doppler paths, $l_\tau$ may be a delay tap, $k_v$ may be a Doppler tap, and $\alpha_i(k, l)$ may be defined in accordance with Equation 8.

$$\alpha_i(k, l) = \begin{cases} 1 & l_{\tau_i} \leq l \leq M \\ e^{-j2\pi\left(\frac{[k-k_{v_i}]_N}{N}\right)} & 0 \leq l \leq l_{\tau_i} \end{cases} \quad (8)$$

In some implementations, a relation between PBCH 230 transmitted by the base station 105-a and received by the UE 115-a in the delay-Doppler domain may be approximated in accordance with Equation 9.

$$\tilde{y}[l', k'] \approx \sum_k \sum_l \tilde{h}[l, k]\tilde{x}\left[\text{mod}(l' - l, \tilde{M}), \text{mod}(k' - k, \tilde{N})\right] \quad (9)$$

As shown in Equation 8, $\tilde{x}[l', k']$ and $\tilde{y}[l', k']$ may be the transmitted and received sequences corresponding to the PBCH 230, respectively, in the delay-Doppler domain and h[l, k] may be the delay-Doppler channel. In some implementations, the UE 115-a may estimate or measure a value of the delay-Doppler channel h[l, k] in accordance with implementing a circular correlator (such as a 2D circular correlator). In some aspects, the UE 115-a may selectively perform or apply the circular correlator in accordance with one or more properties or characteristics of the transmitted or received PBCH 230. For example, the UE 115-a may perform or apply the circular correlator if the sequence $\tilde{x}[l', k']$ has suitable correlation properties (such as a correlation value that satisfies a threshold correlation value) or may refrain from performing or applying the circular correlator if the sequence $\tilde{x}[l', k']$ has unsuitable correlation properties (such as a correlation value that fails to satisfy a threshold correlation value).

In implementations in which the UE 115-a estimates a value of h[l, k], the UE 115-a may calculate, compute, or otherwise determine ICI in OFDM as the off-diagonal elements of $F\tilde{H}F^H$, where $\tilde{H}$ may be defined in accordance with Equation 10 and where F may be an FFT matrix. In accordance with Equation 10, for a zero Doppler scenario, $\tilde{H}$ may become a circular matrix with a first column as a channel impulse response.

$$\tilde{H}[p, q] = \sum_k \sum_l h[l, k]\delta(\text{mod}(p - q - l, M))e^{j2\pi q k} \quad (10)$$

As such, the UE 115-a may measure or estimate a value of the delay-Doppler channel h[l, k] and may use the measured or estimated channel h[l, k] to measure or estimate an ICI associated with the channel. Further, and as a result of implementing the examples disclosed herein, the UE 115-a may be able to more accurately measure or estimate the ICI associated with the channel in scenarios in which the UE 115-a is in a high mobility state (such as moving relatively quickly) or otherwise in a high Doppler scenario.

Figure 6:
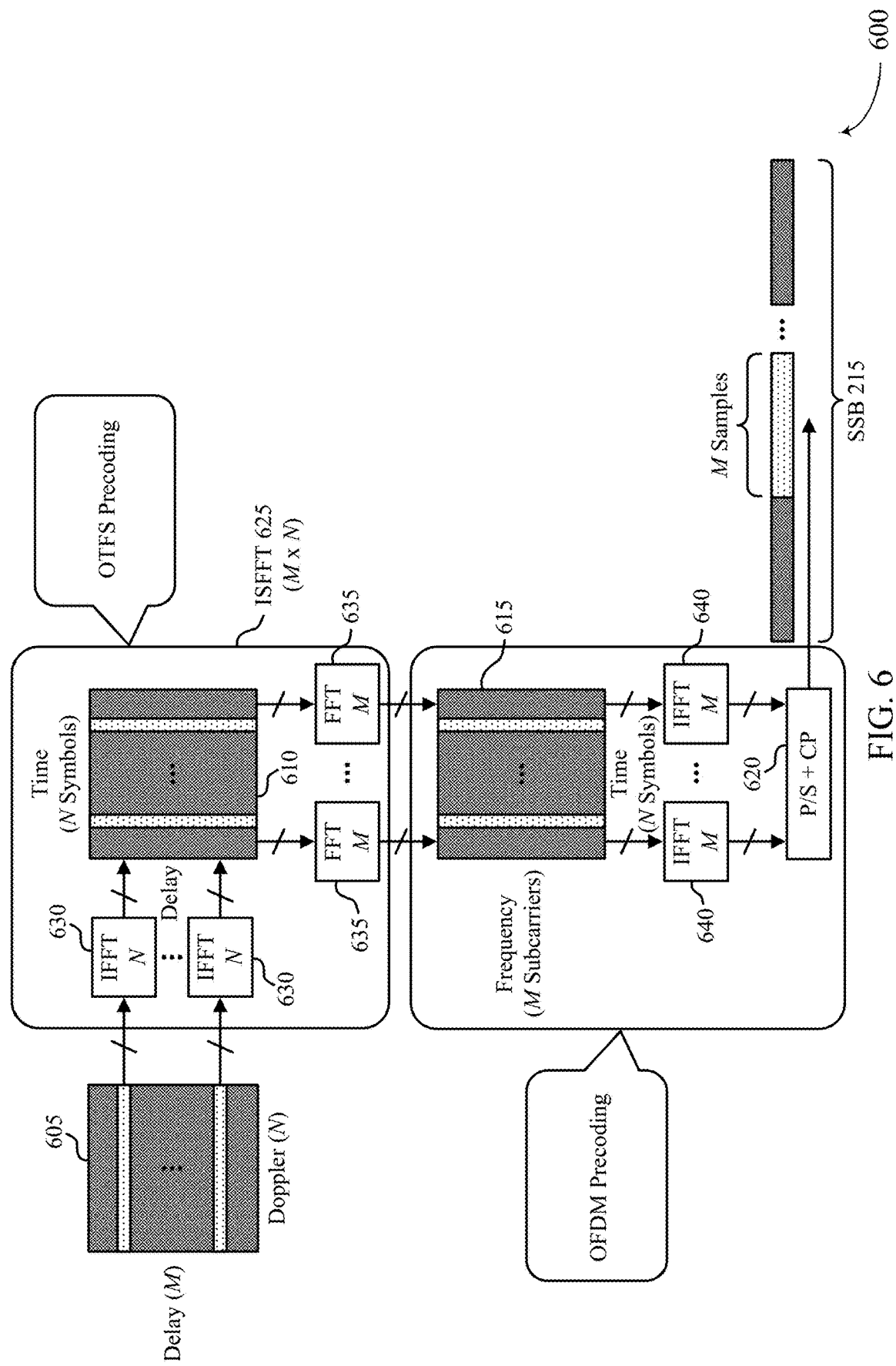
FIG. 6 illustrates an example of a processing diagram that supports PBCH precoding in high-doppler scenarios in accordance with aspects of the present disclosure.

FIG. 6 illustrates an example of a processing diagram 600 that supports PBCH precoding in high-doppler scenarios in accordance with aspects of the present disclosure.

The processing diagram 600 may be implemented to realize aspects of the wireless communications system 100, the wireless communications system 200, the OTFS precoded PBCH allocation 300, the PBCH configuration 400, or the coding scheme 500. For example, a base station 105, such as a base station 105-a with reference to FIG. 2, may perform one or more operations of the processing diagram 600 to support an OTFS transmitter implementation according to which the base station 105-a may convert delay-Doppler domain symbols (such as PBCH 230) to a time-frequency-domain using an ISFFT 625 and generate an SSB 215 using an IFFT 640.

For example, the base station 105-a may allocate or place PBCH 230 or information in a delay-Doppler domain associated with, in the example of FIG. 6, a delay-domain size of M and a Doppler-domain size of N. Accordingly, a set of delay-Doppler domain resources 605 may have dimensions of M×N. For some modulation techniques, such as a quadrature-amplitude modulation (QAM) or a quotient QAM (Q-QAM), the delay-Doppler domain resources 605 may convey MN*log$_2$ (Q) bits.

To generate an OTFS waveform (such as an OTFS precoded waveform), the base station 105-a may perform or apply an ISFFT 625 of size M×N to convert the delay-Doppler domain resources 605 (including PBCH 230) to a set of time-frequency domain resources 615. To perform the ISFFT 625, which may be associated with or equivalently referred to as an OTFS precoding, the base station 105-a may perform or apply an IFFT 630 of size N on the delay-Doppler domain resources 605 to obtain a set of delay-time domain resources 610 and may perform or apply an FFT 635 of size M on the delay-time domain resources 610 to obtain the time-frequency domain resources 615.

The base station 105-a may perform or apply an IFFT 640 of size M on the set of time-frequency domain resources 615 to obtain a phase shift (P/S) and cyclic prefix (CP) 620 associated with an SSB 215. In some aspects, the performance of the IFFT 640 on the set of time-frequency domain resources 615 may involve one or more processing steps that are associated with (such as identical to) processing associated with an OFDM waveform or OFDM precoding. The base station 105-a may output the P/S and CP 620 to the SSB 215. In some aspects, the time-domain signal may include a quantity of N symbols and each of the N symbols may include or convey M samples.

Accordingly, in some implementations, the base station 105-a may perform a first set of one or more operations (such as operations associated with both the OTFS precoding and the OFDM precoding) of the processing diagram 600 for a set of PBCH 230 and may perform a second set of one or more operations (such as operations associated with the OFDM precoding) of the processing diagram 600 for a set of PSS 220 and SSS 225. As such, the base station 105-a may generate and output an SSB 215 including an OTFS precoded first waveform portion carrying PBCH 230 and a non-OTFS precoded second waveform portion (such as an OFDM precoded OFDM waveform portion) carrying PSS 220 and SSS 225. The UE 115-a may receive the SSB 215 and, in some implementations, may perform one or more operations associated with reversing the processing diagram 600 (such as to obtain the PSS 220 and the SSS 225 in the time-frequency domain and to obtain the PBCH 230 in the delay-Doppler domain).

Further, although described herein as including two distinct waveform portions, an SSB 215 conveying the OTFS precoded PBCH 230 and the PSS 220 and the SSS 225 that are not OTFS-precoded may, in some aspects, include a single time-domain waveform. In such aspects, an OTFS precoded first waveform portion and a non-OTFS precoded second waveform portion may be waveforms that appear or exist during encoding and decoding processes (and may not appear in the over-the-air signaling) and, as such, the SSB 215 may be understood as including two distinct waveform portions as a result of such waveform portions appearing or existing during the encoding and decoding processes.

Figure 7:
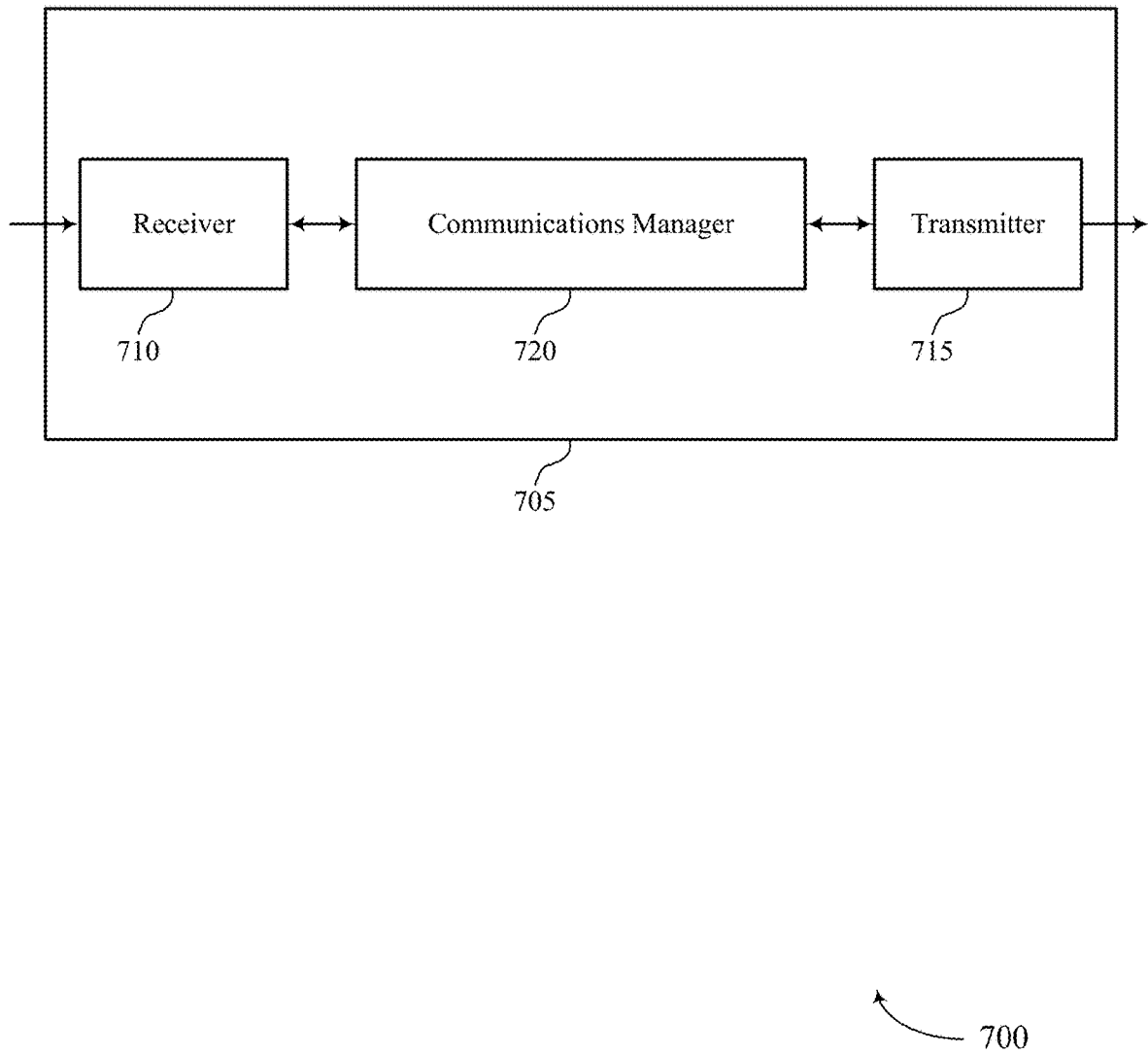
FIGS. 7 and 8 show block diagrams of devices that support PBCH precoding in high-doppler scenarios in accordance with aspects of the present disclosure.

FIG. 7 shows a block diagram 700 of a device 705 that supports PBCH precoding in high-doppler scenarios in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to PBCH precoding in high-doppler scenarios). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to PBCH precoding in high-doppler scenarios). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of PBCH precoding in high-doppler scenarios as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for monitoring for an SSB having synchronization signals and a broadcast channel, the broadcast channel occupying a set of multiple PBCH resources that are uniformly spaced in time and frequency. The communications manager 720 may be configured as or otherwise support a means for receiving PBCH signaling over the broadcast channel in accordance with an OTFS precoding. The communications manager 720 may be configured as or otherwise support a means for establishing or modifying a connection with a base station according to the PBCH signaling.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for PBCH precoding in high-doppler scenarios which may result in reduced processing, reduced power consumption, and more efficient utilization of communication resources.

Figure 8:
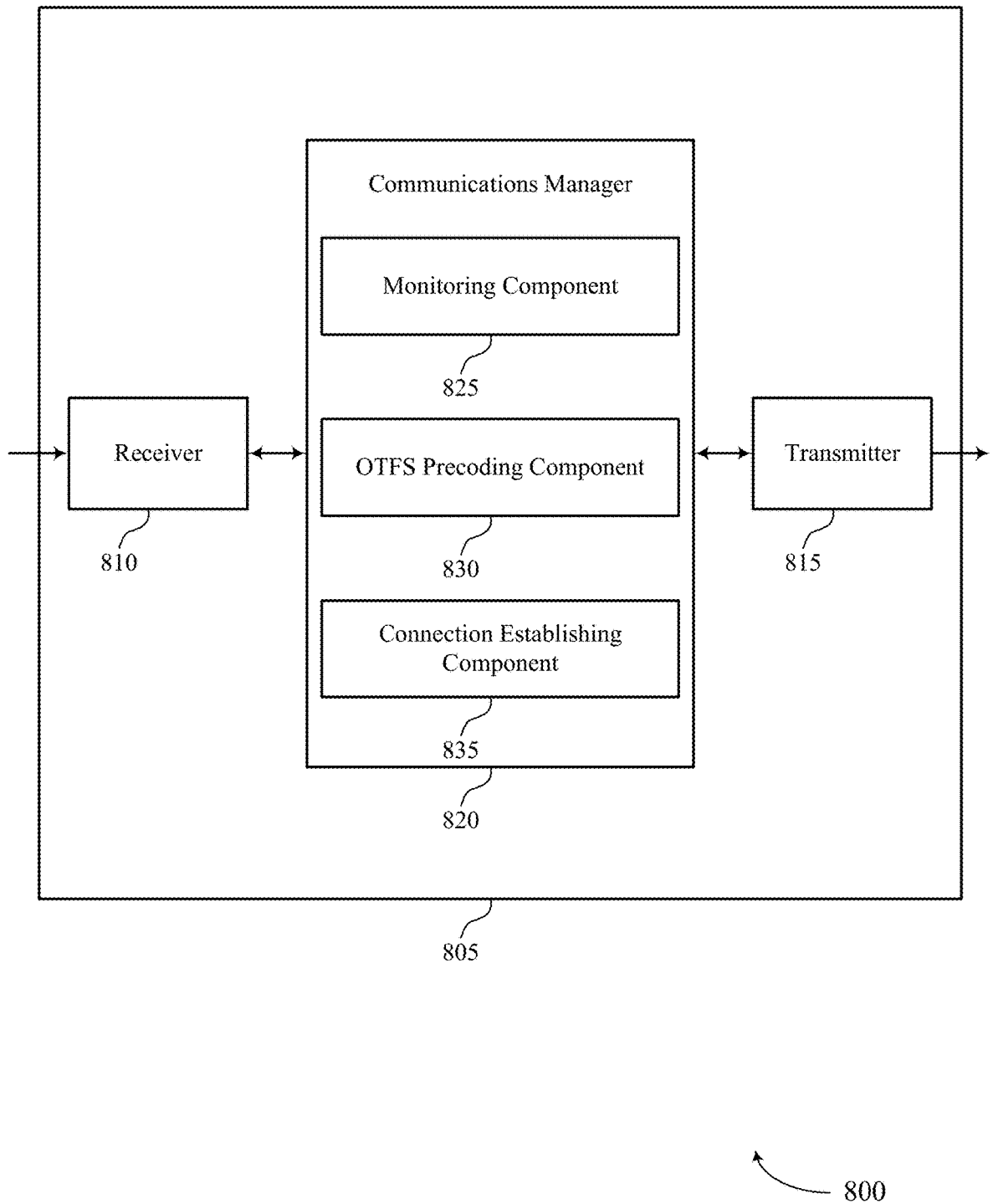

FIG. 8 shows a block diagram 800 of a device 805 that supports PBCH precoding in high-doppler scenarios in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to PBCH precoding in high-doppler scenarios). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PBCH precoding in high-doppler scenarios). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of PBCH precoding in high-doppler scenarios as described herein. For example, the communications manager 820 may include a monitoring component 825, an OTFS precoding component 830, a connection establishing component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The monitoring component 825 may be configured as or otherwise support a means for monitoring for a SSB having synchronization signals and a broadcast channel, the broadcast channel occupying a set of multiple PBCH resources that are uniformly spaced in time and frequency. The OTFS precoding component 830 may be configured as or otherwise support a means for receiving PBCH signaling over the broadcast channel in accordance with an OTFS precoding. The connection establishing component 835 may be configured as or otherwise support a means for establishing or modifying a connection with a base station according to the PBCH signaling.

Figure 9:
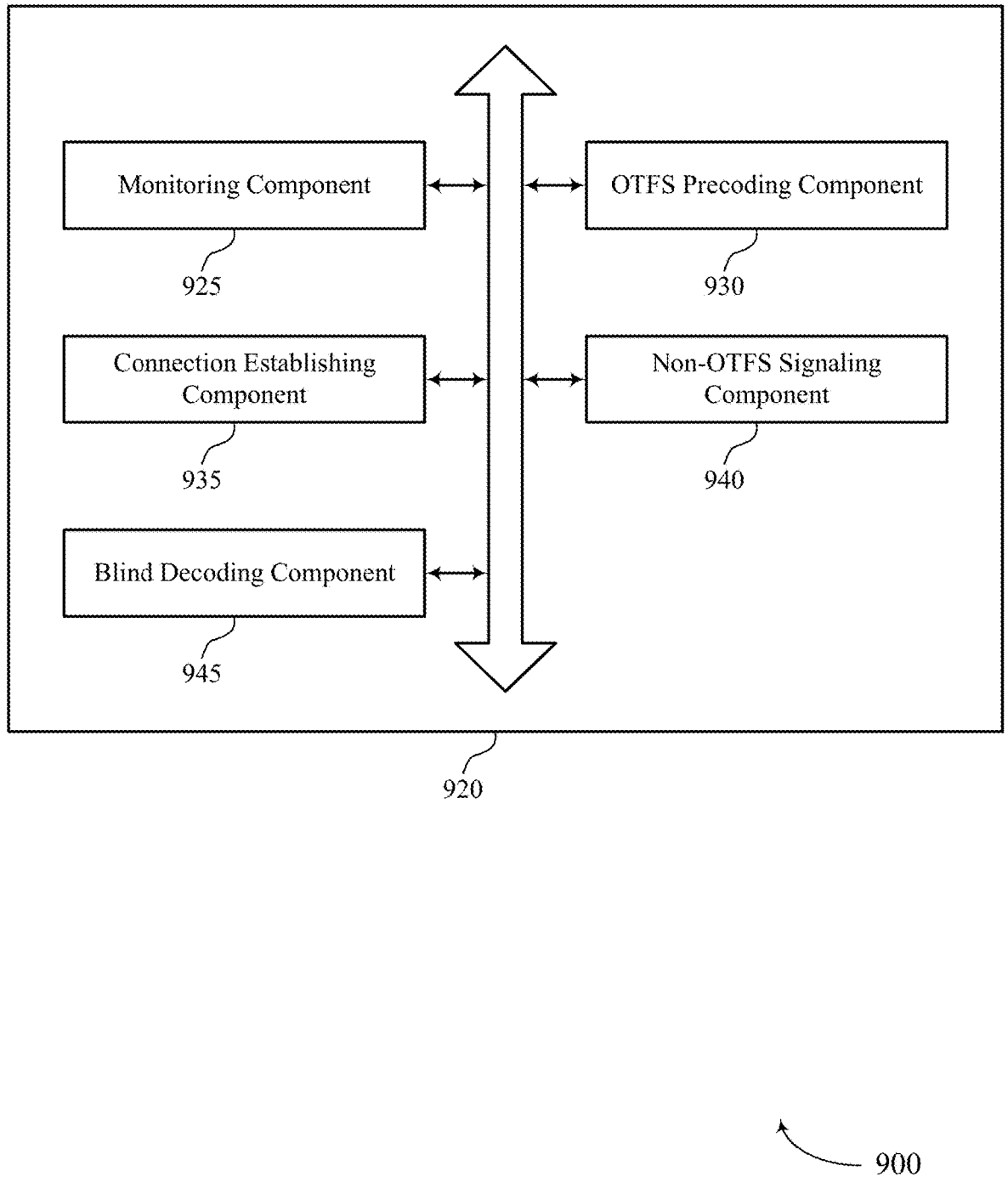
FIG. 9 shows a block diagram of a communications manager that supports PBCH precoding in high-doppler scenarios in accordance with aspects of the present disclosure.

FIG. 9 shows a block diagram 900 of a communications manager 920 that supports PBCH precoding in high-doppler scenarios in accordance with aspects of the present disclosure. The communications manager 920 may be an example of aspects of a communications manager 720, a communications manager 820, or both, as described herein. The communications manager 920, or various components thereof, may be an example of means for performing various aspects of PBCH precoding in high-doppler scenarios as described herein. For example, the communications manager 920 may include a monitoring component 925, an OTFS precoding component 930, a connection establishing component 935, a non-OTFS signaling component 940, a blind decoding component 945, or any combination thereof. Each of these components may communicate, directly or indirectly, with one another (e.g., via one or more buses).

The communications manager 920 may support wireless communications at a UE in accordance with examples as disclosed herein. The monitoring component 925 may be configured as or otherwise support a means for monitoring for a SSB having synchronization signals and a broadcast channel, the broadcast channel occupying a set of multiple PBCH resources that are uniformly spaced in time and frequency. The OTFS precoding component 930 may be configured as or otherwise support a means for receiving PBCH signaling over the broadcast channel in accordance with an OTFS precoding. The connection establishing component 935 may be configured as or otherwise support a means for establishing or modifying a connection with a base station according to the PBCH signaling.

In some examples, the non-OTFS signaling component 940 may be configured as or otherwise support a means for receiving the synchronization signals in accordance with a non-OTFS precoding, where establishing or modifying the connection with the base station is based on the synchronization signals.

In some examples, the blind decoding component 945 may be configured as or otherwise support a means for performing a blind decoding on the PBCH signaling based on a non-OTFS precoding, where the PBCH signaling is received over the broadcast channel in accordance with the OTFS precoding based on the blind decoding being unsuccessful.

In some examples, the set of multiple PBCH resources occupy a second symbol period and a fourth symbol period of the SSB, and the synchronization signals occupy a first symbol period and a third symbol period of the SSB.

In some examples, the set of multiple PBCH resources occupy a second symbol period and a third symbol period of the SSB, and the synchronization signals occupy a first symbol period and a fourth symbol period of the SSB.

In some examples, the set of multiple PBCH resources occupy a third symbol period and a fourth symbol period of the SSB, and the synchronization signals occupy a first symbol period and a second symbol period of the SSB. In some examples, the PBCH signaling is received in accordance with the OTFS precoding based on a quantity of the set of multiple PBCH resources.

In some examples, to support receiving the PBCH signaling, the OTFS precoding component 930 may be configured as or otherwise support a means for receiving the PBCH signaling over the broadcast channel based on one or more guard subcarriers at a high frequency edge or a low frequency edge, or both, of the set of multiple PBCH resources. In some examples, the one or more guard subcarriers include zeroed bits. In some examples, the one or more guard subcarriers include cyclic prefix information.

In some examples, to support receiving the PBCH signaling, the OTFS precoding component 930 may be configured as or otherwise support a means for receiving the PBCH signaling based on a window applied on frequency domain resources of the broadcast channel based on the OTFS precoding.

In some examples, the OTFS precoding component 930 may be configured as or otherwise support a means for receiving a set of multiple demodulation reference signals over the broadcast channel in accordance with the OTFS precoding.

In some examples, a delay domain length of the set of multiple demodulation reference signals is based on a delay spread to PBCH bandwidth ratio, and a Doppler domain length of the set of multiple demodulation reference signals is based on a quantity of PBCH symbols.

In some examples, the OTFS precoding component 930 may be configured as or otherwise support a means for resources for the set of multiple demodulation reference signals in the set of multiple PBCH resources are based on a cell identifier of the base station.

In some examples, the set of multiple PBCH resources include a set of multiple portions of the set of multiple demodulation reference signals. In some examples, the set of multiple demodulation reference signals include a Zadoff-Chu sequence or a pseudo-random noise sequence.

In some examples, the OTFS precoding component 930 may be configured as or otherwise support a means for receiving, from the base station, an indication of the OTFS precoding for the PBCH signaling through the synchronization signals.

Figure 10:
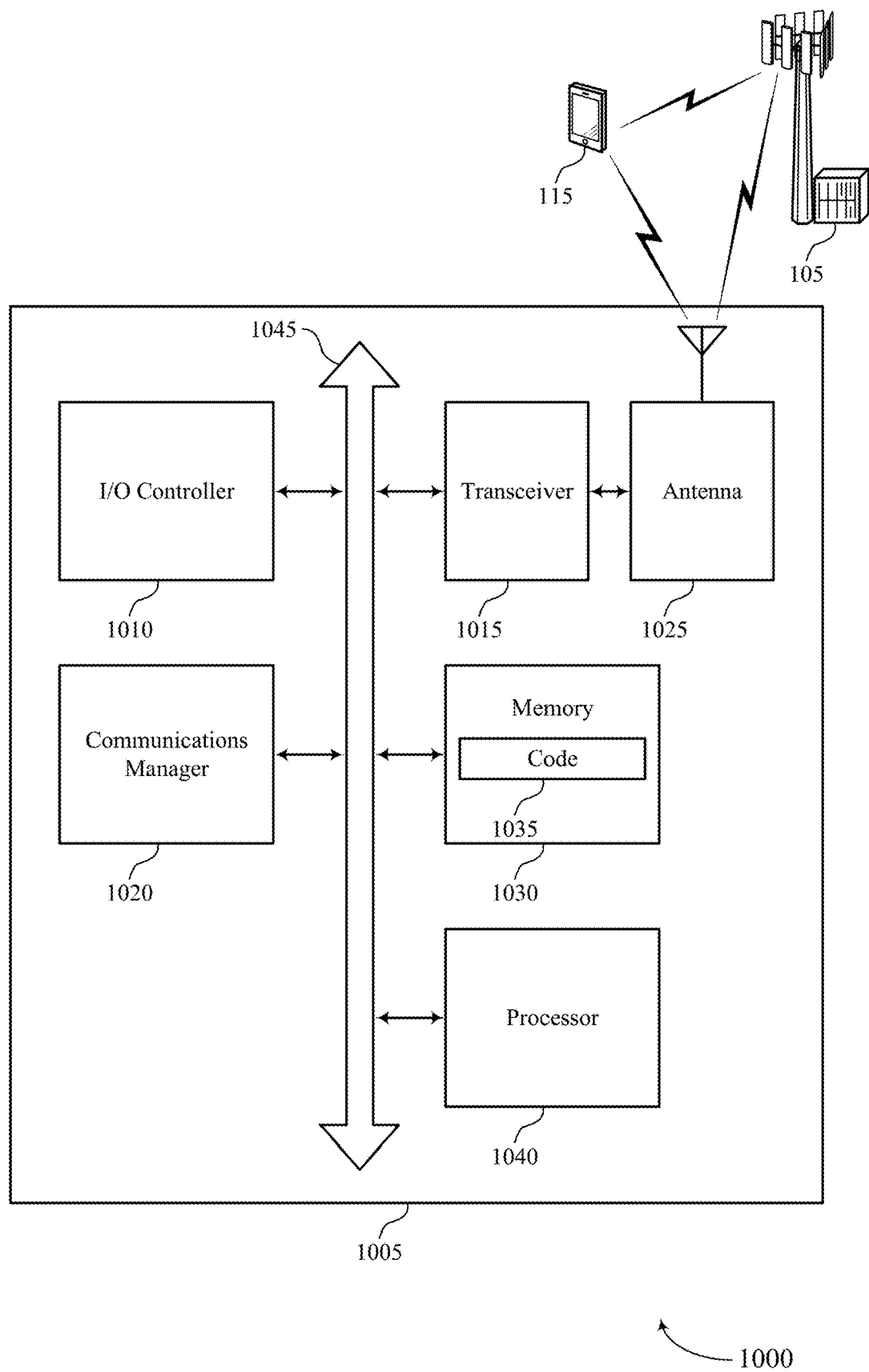
FIG. 10 shows a diagram of a system including a device that supports PBCH precoding in high-doppler scenarios in accordance with aspects of the present disclosure.

FIG. 10 shows a diagram of a system 1000 including a device 1005 that supports PBCH precoding in high-doppler scenarios in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting PBCH precoding in high-doppler scenarios). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for monitoring for a SSB having synchronization signals and a broadcast channel, the broadcast channel occupying a set of multiple PBCH resources that are uniformly spaced in time and frequency. The communications manager 1020 may be configured as or otherwise support a means for receiving PBCH signaling over the broadcast channel in accordance with an OTFS precoding. The communications manager 1020 may be configured as or otherwise support a means for establishing or modifying a connection with a base station according to the PBCH signaling.

By including or configuring the communications manager 1020 in accordance with examples as described herein, the device 1005 may support techniques for PBCH precoding in high-doppler scenarios which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of PBCH precoding in high-doppler scenarios as described herein, or the processor 1040 and the memory 1030 may be otherwise configured to perform or support such operations.

Figure 11:
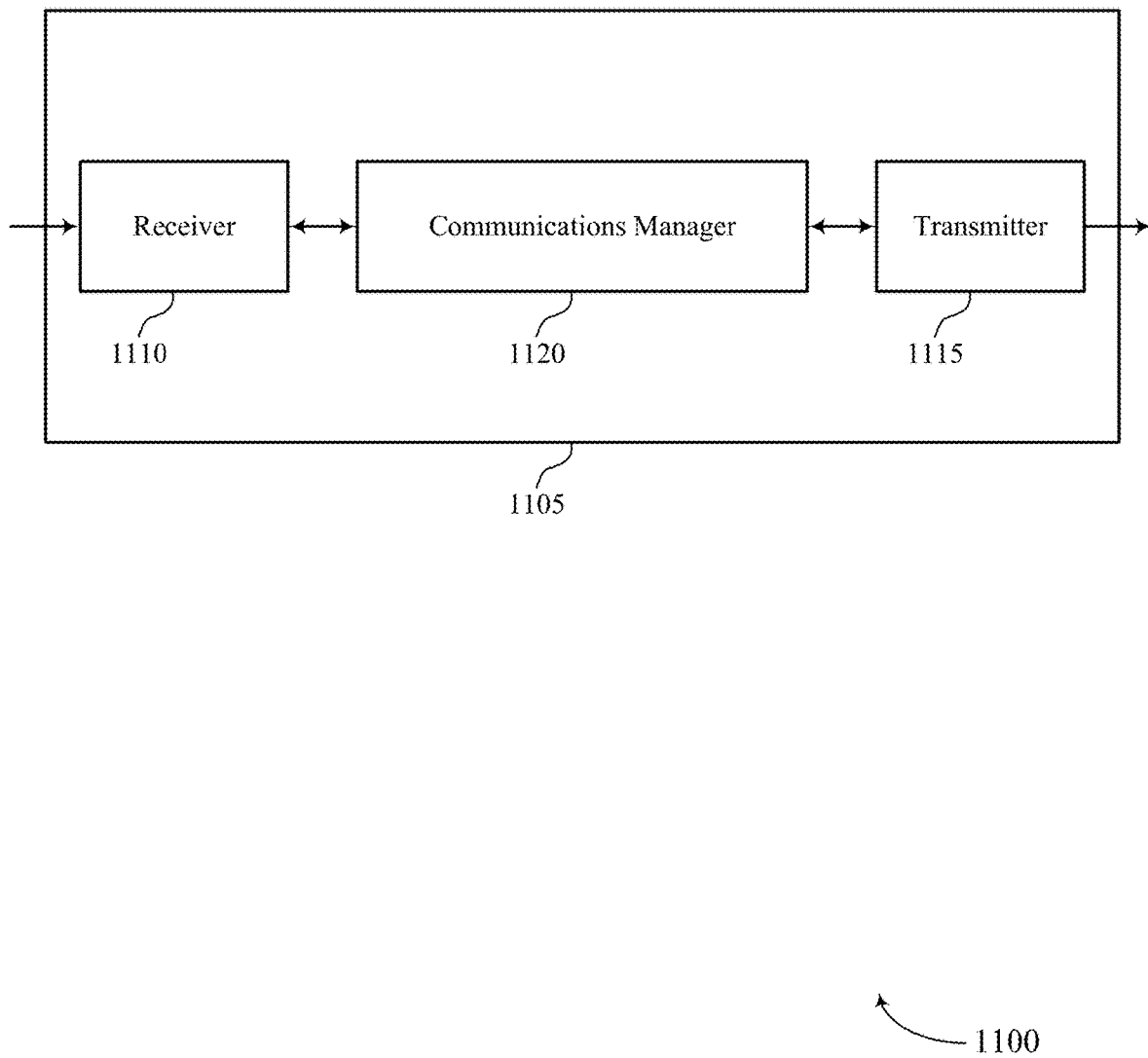
FIGS. 11 and 12 show block diagrams of devices that support PBCH precoding in high-doppler scenarios in accordance with aspects of the present disclosure.

FIG. 11 shows a block diagram 1100 of a device 1105 that supports PBCH precoding in high-doppler scenarios in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to PBCH precoding in high-doppler scenarios). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to PBCH precoding in high-doppler scenarios). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of PBCH precoding in high-doppler scenarios as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for generating a SSB having synchronization signals and a broadcast channel, the broadcast channel occupying a set of multiple PBCH resources. The communications manager 1120 may be configured as or otherwise support a means for transmitting PBCH signaling over the broadcast channel in accordance with an OTFS precoding. The communications manager 1120 may be configured as or otherwise support a means for establishing or modifying a connection with a UE according to the PBCH signaling.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for PBCH precoding in high-doppler scenarios which may result in reduced processing, reduced power consumption, and more efficient utilization of communication resources.

Figure 12:
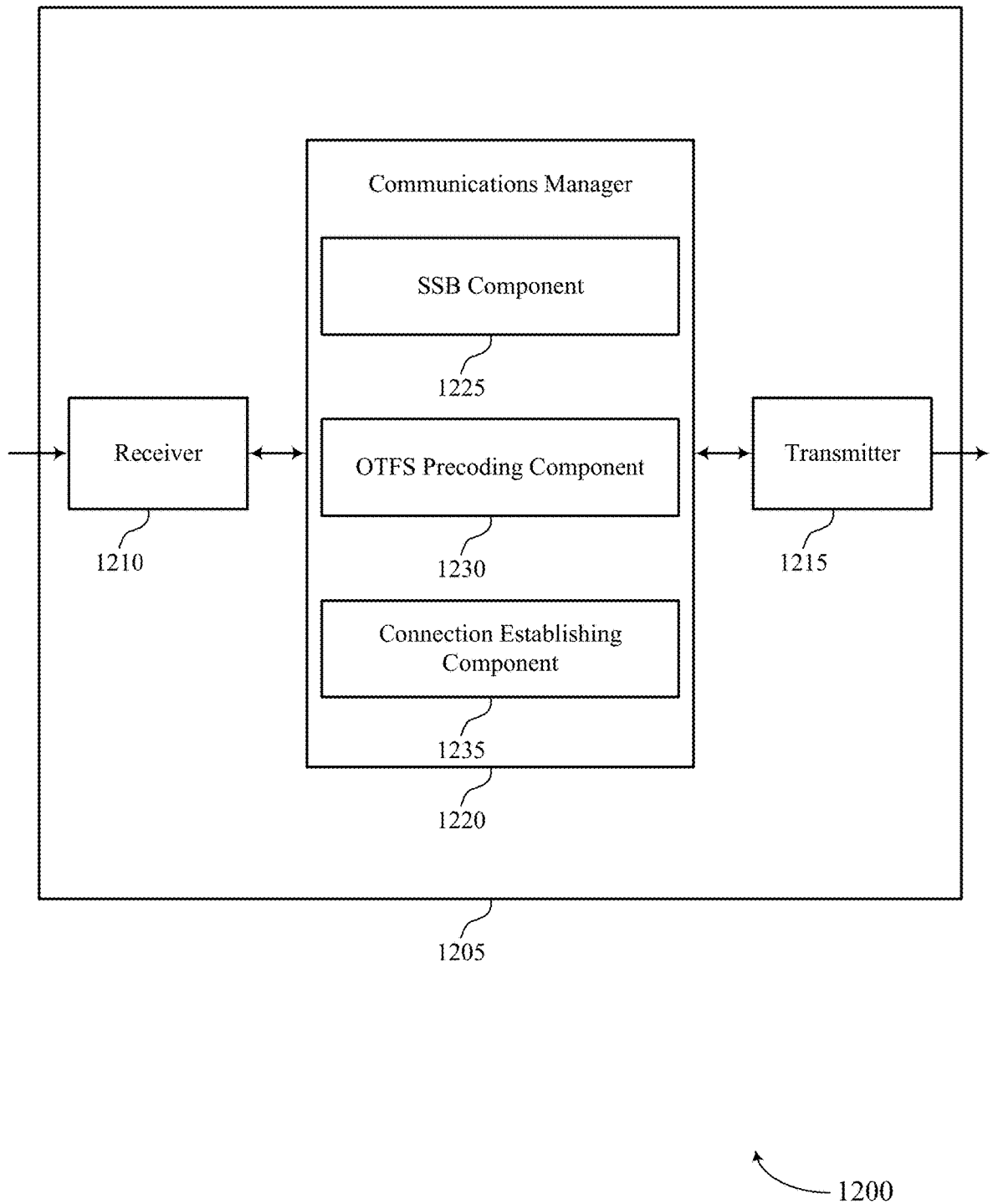

FIG. 12 shows a block diagram 1200 of a device 1205 that supports PBCH precoding in high-doppler scenarios in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to PBCH precoding in high-doppler scenarios). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to PBCH precoding in high-doppler scenarios). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of PBCH precoding in high-doppler scenarios as described herein. For example, the communications manager 1220 may include an SSB component 1225, an OTFS precoding component 1230, a connection establishing component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The SSB component 1225 may be configured as or otherwise support a means for generating a SSB having synchronization signals and a broadcast channel, the broadcast channel occupying a set of multiple PBCH resources. The OTFS precoding component 1230 may be configured as or otherwise support a means for transmitting PBCH signaling over the broadcast channel in accordance with an OTFS precoding. The connection establishing component 1235 may be configured as or otherwise support a means for establishing or modifying a connection with a UE according to the PBCH signaling.

Figure 13:
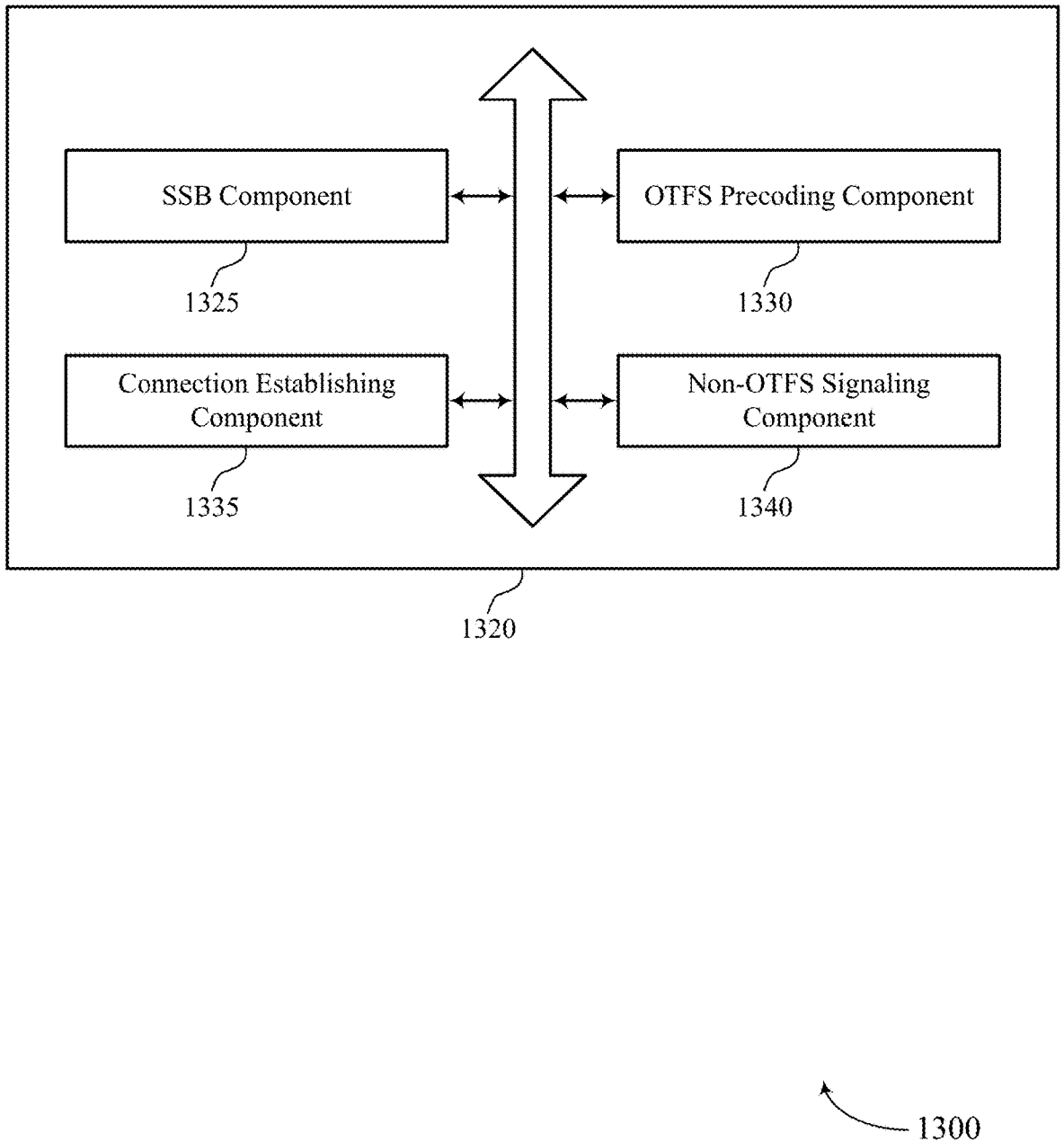
FIG. 13 shows a block diagram of a communications manager that supports PBCH precoding in high-doppler scenarios in accordance with aspects of the present disclosure.

FIG. 13 shows a block diagram 1300 of a communications manager 1320 that supports PBCH precoding in high-doppler scenarios in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of PBCH precoding in high-doppler scenarios as described herein. For example, the communications manager 1320 may include an SSB component 1325, an OTFS precoding component 1330, a connection establishing component 1335, a non-OTFS signaling component 1340, or any combination thereof. Each of these components may communicate, directly or indirectly, with one another (e.g., via one or more buses).

The communications manager 1320 may support wireless communications at a base station in accordance with examples as disclosed herein. The SSB component 1325 may be configured as or otherwise support a means for generating a SSB having synchronization signals and a broadcast channel, the broadcast channel occupying a set of multiple PBCH resources. The OTFS precoding component 1330 may be configured as or otherwise support a means for transmitting PBCH signaling over the broadcast channel in accordance with an OTFS precoding. The connection establishing component 1335 may be configured as or otherwise support a means for establishing or modifying a connection with a UE according to the PBCH signaling.

In some examples, the non-OTFS signaling component 1340 may be configured as or otherwise support a means for transmitting the synchronization signals in accordance with a non-OTFS precoding, where establishing or modifying the connection with the UE is based on the synchronization signals.

In some examples, the set of multiple PBCH resources occupy a second symbol period and a fourth symbol period of the SSB, and the synchronization signals occupy a first symbol period and a third symbol period of the SSB.

In some examples, the set of multiple PBCH resources occupy a second symbol period and a third symbol period of the SSB, and the synchronization signals occupy a first symbol period and a fourth symbol period of the SSB.

In some examples, the set of multiple PBCH resources occupy a third symbol period and a fourth symbol period of the SSB, and the synchronization signals occupy a first symbol period and a second symbol period of the SSB.

In some examples, the PBCH signaling is transmitted in accordance with the OTFS precoding based on a quantity of the set of multiple PBCH resources.

In some examples, to support transmitting the PBCH signaling, the OTFS precoding component 1330 may be configured as or otherwise support a means for transmitting the PBCH signaling over the broadcast channel with on one or more guard subcarriers at a high frequency edge or a low frequency edge, or both, of the set of multiple PBCH resources that are uniformly spaced in time and frequency.

In some examples, the one or more guard subcarriers include zeroed bits or cyclic prefix information, or both.

In some examples, the OTFS precoding component 1330 may be configured as or otherwise support a means for applying a window on frequency domain resources of the broadcast channel based on the OTFS precoding.

In some examples, the OTFS precoding component 1330 may be configured as or otherwise support a means for transmitting a set of multiple demodulation reference signals over the broadcast channel in accordance with the OTFS precoding.

In some examples, a delay domain length of the set of multiple demodulation reference signals is based on a delay spread to PBCH bandwidth ratio, and a Doppler domain length of the set of multiple demodulation reference signals is based on a quantity of PBCH symbols.

In some examples, resources for the set of multiple demodulation reference signals in the set of multiple PBCH resources are based on a cell identifier of the base station. In some examples, the set of multiple PBCH resources include a set of multiple portions of the set of multiple demodulation reference signals. In some examples, the set of multiple demodulation reference signals include a Zadoff-Chu sequence or a pseudo-random noise sequence.

In some examples, the OTFS precoding component 1330 may be configured as or otherwise support a means for transmitting, to the UE, an indication of the OTFS precoding for the PBCH signaling through the synchronization signals.

Figure 14:
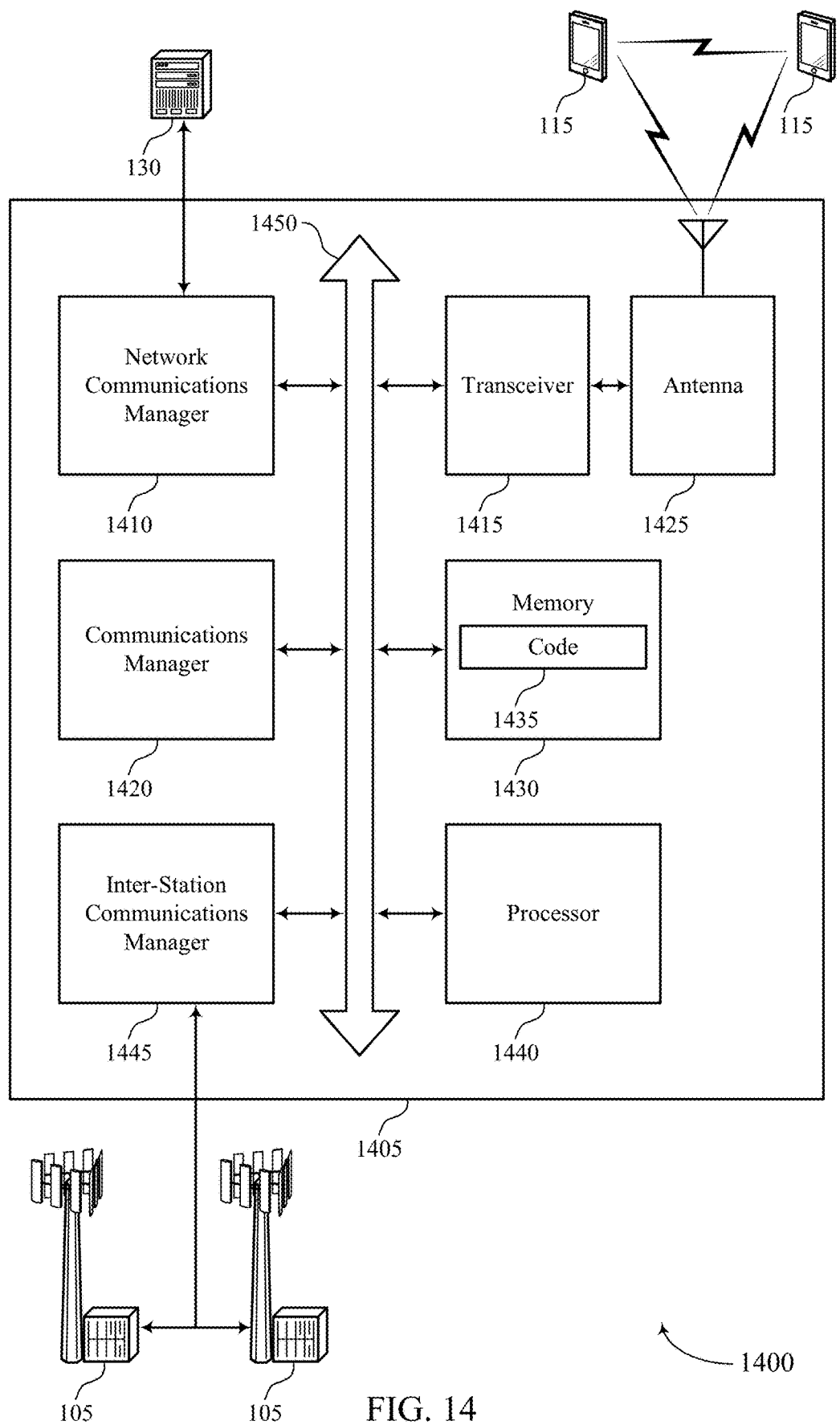
FIG. 14 shows a diagram of a system including a device that supports PBCH precoding in high-doppler scenarios in accordance with aspects of the present disclosure.

FIG. 14 shows a diagram of a system 1400 including a device 1405 that supports PBCH precoding in high-doppler scenarios in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting PBCH precoding in high-doppler scenarios). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for generating a SSB having synchronization signals and a broadcast channel, the broadcast channel occupying a set of multiple PBCH resources. The communications manager 1420 may be configured as or otherwise support a means for transmitting PBCH signaling over the broadcast channel in accordance with an OTFS precoding. The communications manager 1420 may be configured as or otherwise support a means for establishing or modifying a connection with a UE according to the PBCH signaling.

By including or configuring the communications manager 1420 in accordance with examples as described herein, the device 1405 may support techniques for PBCH precoding in high-doppler scenarios which may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of PBCH precoding in high-doppler scenarios as described herein, or the processor 1440 and the memory 1430 may be otherwise configured to perform or support such operations.

Figure 15:
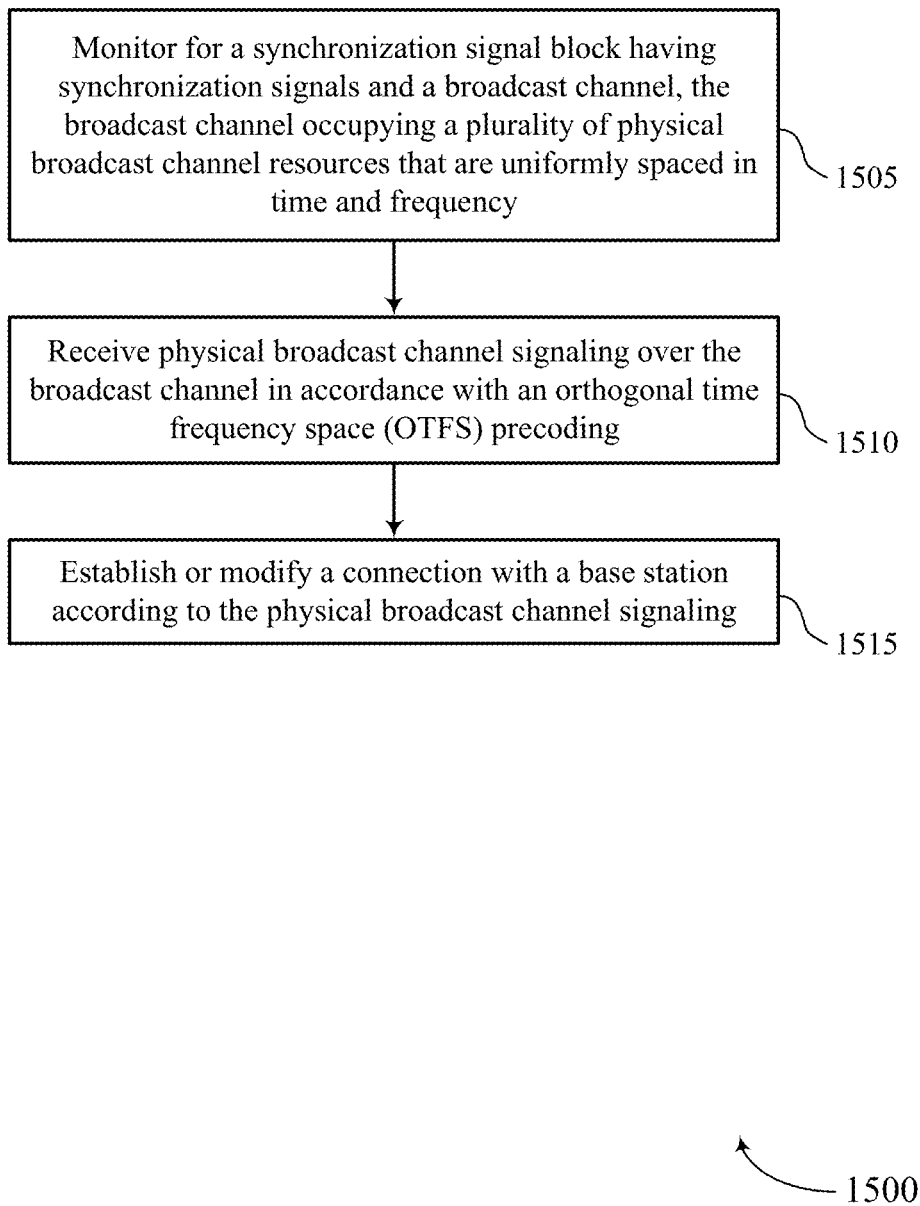
FIGS. 15 and 16 show flowcharts illustrating methods that support PBCH precoding in high-doppler scenarios in accordance with aspects of the present disclosure.

FIG. 15 shows a flowchart illustrating a method 1500 that supports PBCH precoding in high-doppler scenarios in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include monitoring for a SSB having synchronization signals and a broadcast channel, the broadcast channel occupying a set of multiple PBCH resources that are uniformly spaced in time and frequency. The operations of 1505 may be performed in accordance with examples as disclosed herein. In some examples, aspects of the operations of 1505 may be performed by a monitoring component 925 as described with reference to FIG. 9.

At 1510, the method may include receiving PBCH signaling over the broadcast channel in accordance with an OTFS precoding. The operations of 1510 may be performed in accordance with examples as disclosed herein. In some examples, aspects of the operations of 1510 may be performed by an OTFS precoding component 930 as described with reference to FIG. 9.

At 1515, the method may include establishing or modifying a connection with a base station according to the PBCH signaling. The operations of 1515 may be performed in accordance with examples as disclosed herein. In some examples, aspects of the operations of 1515 may be performed by a connection establishing component 935 as described with reference to FIG. 9.

Figure 16:
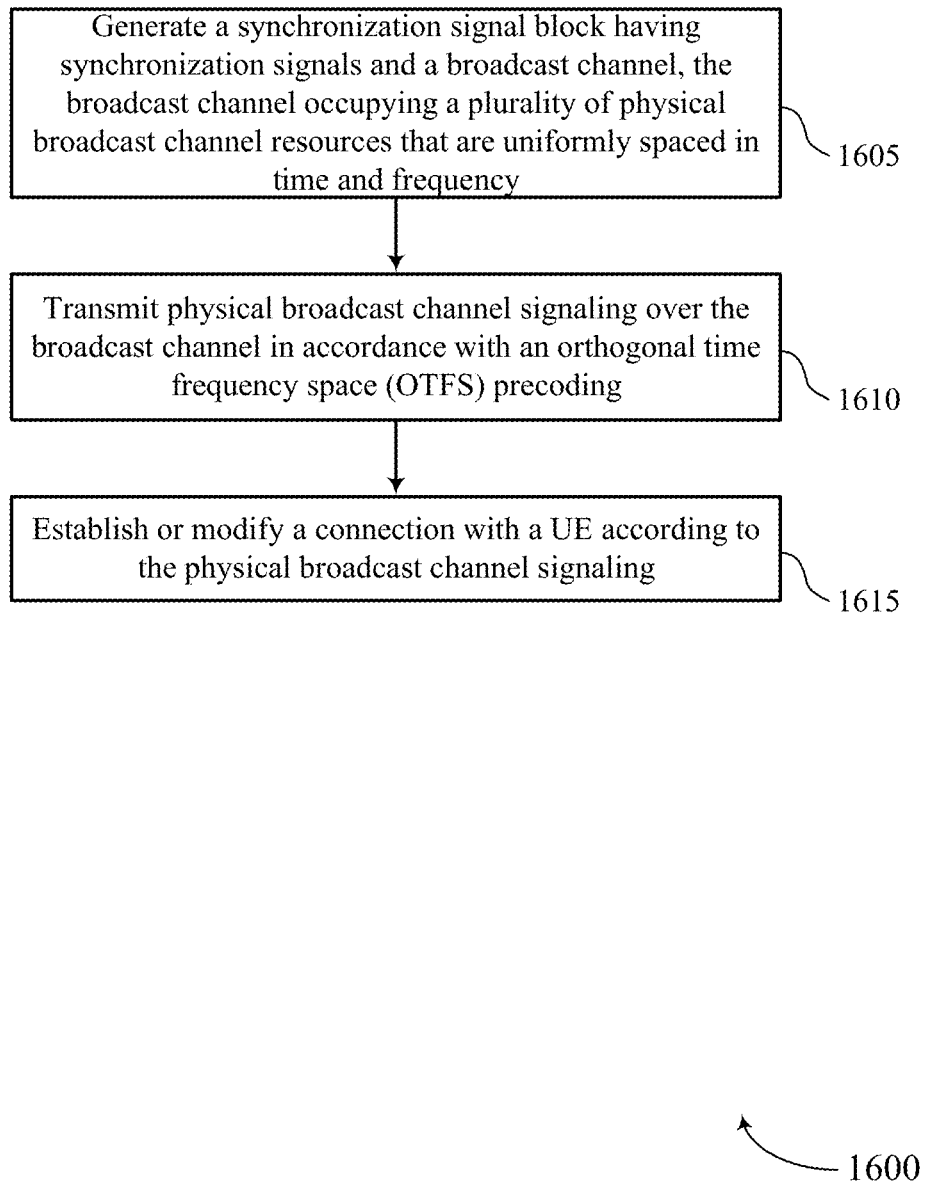

FIG. 16 shows a flowchart illustrating a method 1600 that supports PBCH precoding in high-doppler scenarios in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1605, the method may include generating a SSB having synchronization signals and a broadcast channel, the broadcast channel occupying a set of multiple PBCH resources. The operations of 1605 may be performed in accordance with examples as disclosed herein. In some examples, aspects of the operations of 1605 may be performed by an SSB component 1325 as described with reference to FIG. 13.

At 1610, the method may include transmitting PBCH signaling over the broadcast channel in accordance with an OTFS precoding. The operations of 1610 may be performed in accordance with examples as disclosed herein. In some examples, aspects of the operations of 1610 may be performed by an OTFS precoding component 1330 as described with reference to FIG. 13.

At 1615, the method may include establishing or modifying a connection with a UE according to the PBCH signaling. The operations of 1615 may be performed in accordance with examples as disclosed herein. In some examples, aspects of the operations of 1615 may be performed by a connection establishing component 1335 as described with reference to FIG. 13.

The following provides an overview of aspects of the present disclosure:

Aspect 1: A method for wireless communications at a UE, comprising: monitoring for a synchronization signal block having synchronization signals and a broadcast channel, the broadcast channel occupying a plurality of physical broadcast channel resources that are uniformly spaced in time and frequency; receiving physical broadcast channel signaling over the broadcast channel in accordance with an orthogonal time frequency space (OTFS) precoding; and establishing or modifying a connection with a base station according to the physical broadcast channel signaling.

Aspect 2: The method of aspect 1, further comprising: receiving the synchronization signals in accordance with a non-OTFS precoding, wherein establishing or modifying the connection with the base station is based at least in part on the synchronization signals.

Aspect 3: The method of any of aspects 1 through 2, further comprising: performing a blind decoding on the physical broadcast channel signaling based at least in part on a non-OTFS precoding, wherein the physical broadcast channel signaling is received over the broadcast channel in accordance with the OTFS precoding based at least in part on the blind decoding being unsuccessful.

Aspect 4: The method of any of aspects 1 through 3, wherein the plurality of physical broadcast channel resources occupy a second symbol period and a fourth symbol period of the synchronization signal block, and the synchronization signals occupy a first symbol period and a third symbol period of the synchronization signal block.

Aspect 5: The method of any of aspects 1 through 4, wherein the plurality of physical broadcast channel resources occupy a second symbol period and a third symbol period of the synchronization signal block, and the synchronization signals occupy a first symbol period and a fourth symbol period of the synchronization signal block.

Aspect 6: The method of any of aspects 1 through 5, wherein the plurality of physical broadcast channel resources occupy a third symbol period and a fourth symbol period of the synchronization signal block, and the synchronization signals occupy a first symbol period and a second symbol period of the synchronization signal block.

Aspect 7: The method of any of aspects 1 through 6, wherein the physical broadcast channel signaling is received in accordance with the OTFS precoding based at least in part on a quantity of the plurality of physical broadcast channel resources.

Aspect 8: The method of any of aspects 1 through 7, wherein receiving the physical broadcast channel signaling comprises: receiving the physical broadcast channel signaling over the broadcast channel based at least in part on one or more guard subcarriers at a high frequency edge or a low frequency edge, or both, of the plurality of physical broadcast channel resources.

Aspect 9: The method of aspect 8, wherein the one or more guard subcarriers include zeroed bits.

Aspect 10: The method of any of aspects 8 through 9, wherein the one or more guard subcarriers include cyclic prefix information.

Aspect 11: The method of any of aspects 1 through 10, wherein receiving the physical broadcast channel signaling comprises: receiving the physical broadcast channel signaling based at least in part on a window applied on frequency domain resources of the broadcast channel based at least in part on the OTFS precoding.

Aspect 12: The method of any of aspects 1 through 11, further comprising: receiving a plurality of demodulation reference signals over the broadcast channel in accordance with the OTFS precoding.

Aspect 13: The method of aspect 12, wherein a delay domain length of the plurality of demodulation reference signals is based at least in part on a delay spread to physical broadcast channel bandwidth ratio, and a Doppler domain length of the plurality of demodulation reference signals is based at least in part on a quantity of physical broadcast channel symbols.

Aspect 14: The method of any of aspects 12 through 13, further comprising: resources for the plurality of demodulation reference signals in the plurality of physical broadcast channel resources are based at least in part on a cell identifier of the base station.

Aspect 15: The method of any of aspects 12 through 14, wherein the plurality of physical broadcast channel resources include a plurality of portions of the plurality of demodulation reference signals.

Aspect 16: The method of any of aspects 12 through 15, wherein the plurality of demodulation reference signals include a Zadoff-Chu sequence or a pseudo-random noise sequence.

Aspect 17: The method of any of aspects 1 through 16, further comprising: receiving, from the base station, an indication of the OTFS precoding for the physical broadcast channel signaling through the synchronization signals.

Aspect 18: A method for wireless communications at a base station, comprising: generating a synchronization signal block having synchronization signals and a broadcast channel, the broadcast channel occupying a plurality of physical broadcast channel resources that are uniformly spaced in time and frequency; transmitting physical broadcast channel signaling over the broadcast channel in accordance with an orthogonal time frequency space (OTFS) precoding; and establishing or modifying a connection with a UE according to the physical broadcast channel signaling.

Aspect 19: The method of aspect 18, further comprising: transmitting the synchronization signals in accordance with a non-OTFS precoding, wherein establishing or modifying the connection with the UE is based at least in part on the synchronization signals.

Aspect 20: The method of any of aspects 18 through 19, wherein the plurality of physical broadcast channel resources occupy a second symbol period and a fourth symbol period of the synchronization signal block, and the synchronization signals occupy a first symbol period and a third symbol period of the synchronization signal block.

Aspect 21: The method of any of aspects 18 through 20, wherein the plurality of physical broadcast channel resources occupy a second symbol period and a third symbol period of the synchronization signal block, and the synchronization signals occupy a first symbol period and a fourth symbol period of the synchronization signal block.

Aspect 22: The method of any of aspects 18 through 21, wherein the plurality of physical broadcast channel resources occupy a third symbol period and a fourth symbol period of the synchronization signal block, and the synchronization signals occupy a first symbol period and a second symbol period of the synchronization signal block.

Aspect 23: The method of any of aspects 18 through 22, wherein the physical broadcast channel signaling is transmitted in accordance with the OTFS precoding based at least in part on a quantity of the plurality of physical broadcast channel resources.

Aspect 24: The method of any of aspects 18 through 23, wherein transmitting the physical broadcast channel signaling comprises: transmitting the physical broadcast channel signaling over the broadcast channel with on one or more guard subcarriers at a high frequency edge or a low frequency edge, or both, of the plurality of physical broadcast channel resources that are uniform in time and frequency.

Aspect 25: The method of aspect 24, wherein the one or more guard subcarriers include zeroed bits or cyclic prefix information, or both.

Aspect 26: The method of any of aspects 18 through 25, further comprising: applying a window on frequency domain resources of the broadcast channel based at least in part on the OTFS precoding.

Aspect 27: The method of any of aspects 18 through 26, further comprising: transmitting a plurality of demodulation reference signals over the broadcast channel in accordance with the OTFS precoding.

Aspect 28: The method of aspect 27, wherein a delay domain length of the plurality of demodulation reference signals is based at least in part on a delay spread to physical broadcast channel bandwidth ratio, and a Doppler domain length of the plurality of demodulation reference signals is based at least in part on a quantity of physical broadcast channel symbols.

Aspect 29: The method of any of aspects 27 through 28, wherein resources for the plurality of demodulation reference signals in the plurality of physical broadcast channel resources are based at least in part on a cell identifier of the base station.

Aspect 30: The method of any of aspects 27 through 29, wherein the plurality of physical broadcast channel resources include a plurality of portions of the plurality of demodulation reference signals.

Aspect 31: The method of any of aspects 27 through 30, wherein the plurality of demodulation reference signals include a Zadoff-Chu sequence or a pseudo-random noise sequence.

Aspect 32: The method of any of aspects 18 through 31, further comprising: transmitting, to the UE, an indication of the OTFS precoding for the physical broadcast channel signaling through the synchronization signals.

Aspect 33: An apparatus for wireless communications at a UE, comprising a processor; memory coupled with the processor; and instructions stored in the memory and executable by the processor to cause the apparatus to perform a method of any of aspects 1 through 17.

Aspect 34: An apparatus for wireless communications at a UE, comprising at least one means for performing a method of any of aspects 1 through 17.

Aspect 35: A non-transitory computer-readable medium storing code for wireless communications at a UE, the code comprising instructions executable by a processor to perform a method of any of aspects 1 through 17.

Aspect 36: An apparatus for wireless communications at a base station, comprising a processor; memory coupled with the processor; and instructions stored in the memory and executable by the processor to cause the apparatus to perform a method of any of aspects 18 through 32.

Aspect 37: An apparatus for wireless communications at a base station, comprising at least one means for performing a method of any of aspects 18 through 32.

Aspect 38: A non-transitory computer-readable medium storing code for wireless communications at a base station, the code comprising instructions executable by a processor to perform a method of any of aspects 18 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the apparatus to:
      monitor for a synchronization signal block having synchronization signals and a broadcast channel, the broadcast channel occupying a plurality of physical broadcast channel resources that are uniformly spaced in time and frequency;
      receive physical broadcast channel signaling over the broadcast channel in accordance with an orthogonal time frequency space (OTFS) precoding;
      receive the synchronization signals in accordance with a non-OTFS precoding; and
      establish or modify a connection with a base station according to the physical broadcast channel signaling and the synchronization signals.

2. The apparatus of claim 1, wherein the instructions are further executable by the one or more processors to cause the apparatus to:

perform a blind decoding on the physical broadcast channel signaling based at least in part on a non-OTFS precoding, wherein the physical broadcast channel signaling is received over the broadcast channel in accordance with the OTFS precoding based at least in part on the blind decoding being unsuccessful.

3. The apparatus of claim 1, wherein the plurality of physical broadcast channel resources occupy a second symbol period and a fourth symbol period of the synchronization signal block, and the synchronization signals occupy a first symbol period and a third symbol period of the synchronization signal block.

4. The apparatus of claim 1, wherein the plurality of physical broadcast channel resources occupy a second symbol period and a third symbol period of the synchronization signal block, and the synchronization signals occupy a first symbol period and a fourth symbol period of the synchronization signal block.

5. The apparatus of claim 1, wherein the plurality of physical broadcast channel resources occupy a third symbol period and a fourth symbol period of the synchronization signal block, and the synchronization signals occupy a first symbol period and a second symbol period of the synchronization signal block.

6. The apparatus of claim 1, wherein the physical broadcast channel signaling is received in accordance with the OTFS precoding based at least in part on a quantity of the plurality of physical broadcast channel resources.

7. The apparatus of claim 1, wherein the instructions to receive the physical broadcast channel signaling are executable by the one or more processors to cause the apparatus to:

receive the physical broadcast channel signaling over the broadcast channel based at least in part on one or more guard subcarriers at a high frequency edge or a low frequency edge, or both, of the plurality of physical broadcast channel resources.

8. The apparatus of claim 7, wherein:
the one or more guard subcarriers include zeroed bits.

9. The apparatus of claim 7, wherein:
the one or more guard subcarriers include cyclic prefix information.

10. The apparatus of claim 1, wherein the instructions to receive the physical broadcast channel signaling are executable by the one or more processors to cause the apparatus to:

receive the physical broadcast channel signaling based at least in part on a window applied on frequency domain resources of the broadcast channel based at least in part on the OTFS precoding.

11. The apparatus of claim 1, wherein the instructions are further executable by the one or more processors to cause the apparatus to:

receive a plurality of demodulation reference signals over the broadcast channel in accordance with the OTFS precoding.

12. The apparatus of claim 11, wherein a delay domain length of the plurality of demodulation reference signals is based at least in part on a delay spread to physical broadcast channel bandwidth ratio, and a Doppler domain length of the plurality of demodulation reference signals is based at least in part on a quantity of physical broadcast channel symbols.

13. The apparatus of claim 11, wherein the instructions are further executable by the one or more processors to cause the apparatus to:

resources for the plurality of demodulation reference signals in the plurality of physical broadcast channel resources be based at least in part on a cell identifier of the base station.

14. The apparatus of claim 11, wherein the plurality of physical broadcast channel resources include a plurality of portions of the plurality of demodulation reference signals.

15. The apparatus of claim 11, wherein the plurality of demodulation reference signals include a Zadoff-Chu sequence or a pseudo-random noise sequence.

16. The apparatus of claim 1, wherein the instructions are further executable by the one or more processors to cause the apparatus to:

receive, from the base station, an indication of the OTFS precoding for the physical broadcast channel signaling through the synchronization signals.

17. An apparatus for wireless communications at a base station, comprising:
one or more processors;
memory coupled with the one or more processors; and
instructions stored in the memory and executable by the one or more processors to cause the apparatus to:
generate a synchronization signal block having synchronization signals and a broadcast channel, the broadcast channel occupying a plurality of physical broadcast channel resources that are uniformly spaced in time and frequency;
transmit physical broadcast channel signaling over the broadcast channel in accordance with an orthogonal time frequency space (OTFS) precoding;
transmit the synchronization signals in accordance with a non-OTFS precoding; and
establish or modify a connection with a user equipment (UE) according to the physical broadcast channel signaling and the synchronization signals.

18. The apparatus of claim 17, wherein the plurality of physical broadcast channel resources occupy a second symbol period and a fourth symbol period of the synchronization signal block, and the synchronization signals occupy a first symbol period and a third symbol period of the synchronization signal block.

19. The apparatus of claim 17, wherein the plurality of physical broadcast channel resources occupy a second symbol period and a third symbol period of the synchronization signal block, and the synchronization signals occupy a first symbol period and a fourth symbol period of the synchronization signal block.

20. The apparatus of claim 17, wherein the plurality of physical broadcast channel resources occupy a third symbol period and a fourth symbol period of the synchronization signal block, and the synchronization signals occupy a first symbol period and a second symbol period of the synchronization signal block.

21. The apparatus of claim 17, wherein the physical broadcast channel signaling is transmitted in accordance with the OTFS precoding based at least in part on a quantity of the plurality of physical broadcast channel resources.

22. The apparatus of claim 17, wherein the instructions to transmit the physical broadcast channel signaling are executable by the one or more processors to cause the apparatus to:

transmit the physical broadcast channel signaling over the broadcast channel with on one or more guard subcarriers at a high frequency edge or a low frequency edge, or both, of the plurality of physical broadcast channel resources that are uniform in time and frequency.

23. The apparatus of claim 22, wherein the one or more guard subcarriers include zeroed bits or cyclic prefix information, or both.

24. The apparatus of claim 17, wherein the instructions are further executable by the one or more processors to cause the apparatus to:
apply a window on frequency domain resources of the broadcast channel based at least in part on the OTFS precoding.

25. The apparatus of claim 17, wherein the instructions are further executable by the one or more processors to cause the apparatus to:
transmit a plurality of demodulation reference signals over the broadcast channel in accordance with the OTFS precoding.

26. The apparatus of claim 17, wherein the instructions are further executable by the one or more processors to cause the apparatus to:
transmit, to the UE, an indication of the OTFS precoding for the physical broadcast channel signaling through the synchronization signals.

27. A method for wireless communications at a user equipment (UE), comprising:
monitoring for a synchronization signal block having synchronization signals and a broadcast channel, the broadcast channel occupying a plurality of physical broadcast channel resources that are uniformly spaced in time and frequency;
receiving physical broadcast channel signaling over the broadcast channel in accordance with an orthogonal time frequency space (OTFS) precoding;
receiving the synchronization signals in accordance with a non-OTFS precoding; and
establishing or modifying a connection with a base station according to the physical broadcast channel signaling and the synchronization signals.

28. A method for wireless communications at a base station, comprising:
generating a synchronization signal block having synchronization signals and a broadcast channel, the broadcast channel occupying a plurality of physical broadcast channel resources that are uniformly spaced in time and frequency;
transmitting physical broadcast channel signaling over the broadcast channel in accordance with an orthogonal time frequency space (OTFS) precoding;
transmitting the synchronization signals in accordance with a non-OTFS precoding; and
establishing or modifying a connection with a user equipment (UE) according to the physical broadcast channel signaling and the synchronization signals.

29. The method of claim 27, further comprising:
performing a blind decoding on the physical broadcast channel signaling based at least in part on a non-OTFS precoding, wherein the physical broadcast channel signaling is received over the broadcast channel in accordance with the OTFS precoding based at least in part on the blind decoding being unsuccessful.

30. The method of claim 27, wherein the plurality of physical broadcast channel resources occupy a second symbol period and a fourth symbol period of the synchronization signal block, and the synchronization signals occupy a first symbol period and a third symbol period of the synchronization signal block.

* * * * *